(12) United States Patent
Lecompere et al.

(10) Patent No.: US 12,023,864 B2
(45) Date of Patent: Jul. 2, 2024

(54) METHOD FOR MANUFACTURING AN OPTICAL VOLUME ELEMENT FROM A CURABLE MATERIAL USING AN ADDITIVE MANUFACTURING TECHNOLOGY

(71) Applicant: Essilor International, Charenton-le-Pont (FR)

(72) Inventors: Maxime Lecompere, Charenton-le-Pont (FR); Pierre Leite, Charenton-le-Pont (FR); Manuel Theodet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 236 days.

(21) Appl. No.: 17/310,739

(22) PCT Filed: Feb. 21, 2020

(86) PCT No.: PCT/EP2020/054696
§ 371 (c)(1),
(2) Date: Aug. 20, 2021

(87) PCT Pub. No.: WO2020/169837
PCT Pub. Date: Aug. 27, 2020

(65) Prior Publication Data
US 2022/0118705 A1    Apr. 21, 2022

(30) Foreign Application Priority Data
Feb. 22, 2019   (EP) ..................................... 19305218

(51) Int. Cl.
*B29C 64/124*    (2017.01)
*B29C 64/112*    (2017.01)
(Continued)

(52) U.S. Cl.
CPC .......... *B29C 64/282* (2017.08); *B29C 64/112* (2017.08); *B29C 64/124* (2017.08);
(Continued)

(58) Field of Classification Search
CPC .................................................... B29C 64/124
See application file for complete search history.

(56) References Cited

U.S. PATENT DOCUMENTS

| 4,575,330 A | 3/1986 | Hull |
| 5,089,184 A | 2/1992 | Hirano et al. |

(Continued)

FOREIGN PATENT DOCUMENTS

| CN | 108170007 | 6/2018 |
| CN | 108274745 | 2/2021 |

(Continued)

OTHER PUBLICATIONS

International Search Report & Written Opinion issued in priority application PCT/EP2020/067539, dated Sep. 1, 2020.
(Continued)

*Primary Examiner* — Edmund H Lee
(74) *Attorney, Agent, or Firm* — Norton Rose Fulbright US LLP

(57) ABSTRACT

A method for manufacturing an optical element (100) from a curable material (50) using an additive manufacturing technology comprising steps of: providing a first portion of curable material (50), forming a first part of the optical element by irradiating the surface (55) of the curable material with a first curing surface energy, the first curing surface energy being strictly lower than a first predetermined energy threshold and higher than a second predetermined threshold, and forming, after the irradiation of the first part with the first curing surface energy, at least a second part of the optical element, distinct from the first part of the optical (Continued)

Figure 1:
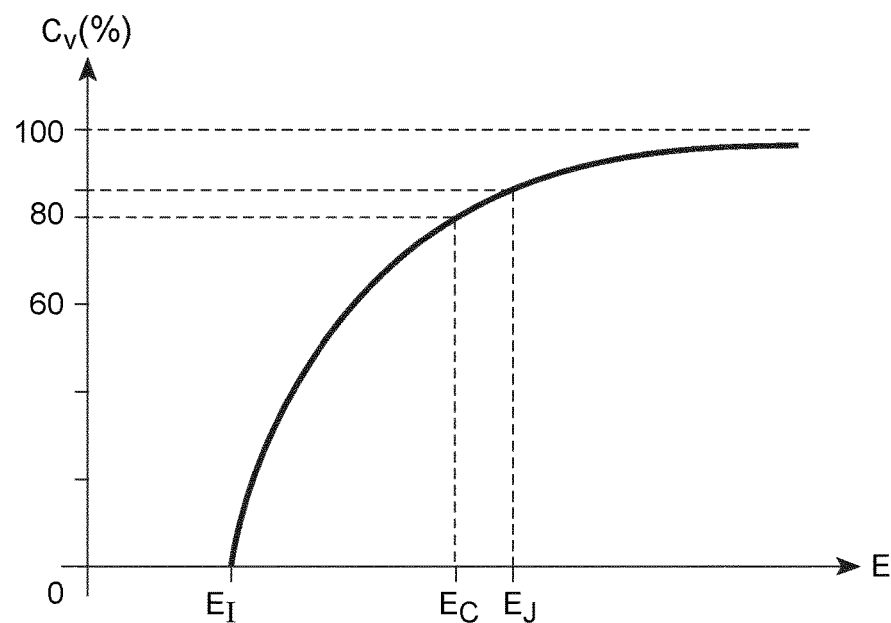

element, by irradiating, with at least a second curing surface energy, the surface of the curable material, the second curing surface energy irradiating both the second part of the optical element (100) and at least a portion of the first part of the optical element, the sum of the first curing surface energy and the at least second curing surface energy being higher than or equal to the first predetermined energy threshold. A manufacturing system (1) for manufacturing an optical element.

22 Claims, 7 Drawing Sheets

(51) Int. Cl.
| | |
|---|---|
| *B29C 64/232* | (2017.01) |
| *B29C 64/245* | (2017.01) |
| *B29C 64/282* | (2017.01) |
| *B29C 64/393* | (2017.01) |
| *B29D 11/00* | (2006.01) |
| *B29L 11/00* | (2006.01) |
| *B33Y 10/00* | (2015.01) |
| *B33Y 30/00* | (2015.01) |
| *B33Y 50/02* | (2015.01) |
| *B33Y 80/00* | (2015.01) |

(52) U.S. Cl.
CPC .......... *B29C 64/232* (2017.08); *B29C 64/245* (2017.08); *B29C 64/393* (2017.08); *B29D 11/00442* (2013.01); B29L 2011/0016 (2013.01); B33Y 10/00 (2014.12); B33Y 30/00 (2014.12); B33Y 50/02 (2014.12); B33Y 80/00 (2014.12)

(56) References Cited

U.S. PATENT DOCUMENTS

| | | | |
|---|---|---|---|
| 5,104,592 | A | 4/1992 | Hull |
| 9,937,664 | B2 | 4/2018 | Thiel et al. |
| 9,969,135 | B2 | 5/2018 | Valeri et al. |
| 10,137,645 | B2 | 11/2018 | Quere et al. |
| 10,363,710 | B2 | 7/2019 | Rodriguez et al. |
| 10,442,146 | B2 | 10/2019 | Gourraud |
| 10,459,247 | B2 | 10/2019 | Anatole et al. |
| 10,870,239 | B2 | 12/2020 | Fenley et al. |
| 11,511,483 | B2 | 11/2022 | Theodet |
| 11,548,215 | B2 | 1/2023 | Soppera et al. |
| 2005/0248062 | A1 | 11/2005 | Shkolnik et al. |
| 2011/0196529 | A1 | 8/2011 | Shkolnik et al. |
| 2011/0029048 | A1 | 10/2011 | Gullentops |
| 2012/0219698 | A1 | 8/2012 | Steingart et al. |
| 2014/0042683 | A1 | 2/2014 | Kiridena et al. |
| 2015/0130114 | A1* | 5/2015 | Joyce .................... B29C 64/393 425/162 |
| 2016/0114530 | A1 | 4/2016 | Thiel et al. |
| 2016/0114542 | A1 | 4/2016 | Quere et al. |
| 2016/0221262 | A1 | 8/2016 | Das et al. |
| 2016/0244628 | A1 | 8/2016 | Breton et al. |
| 2017/0012679 | A1 | 4/2017 | Greene et al. |
| 2017/0146822 | A1 | 5/2017 | Wildsmith et al. |
| 2017/0210072 | A1 | 7/2017 | Rodriguez et al. |
| 2018/0056604 | A1* | 3/2018 | Sands .................... B29C 64/386 |
| 2018/0339397 | A1 | 11/2018 | Redfield |
| 2018/0370149 | A1 | 12/2018 | Ishibe |
| 2021/0387431 | A1 | 12/2021 | Baudart et al. |
| 2022/0118705 | A1 | 4/2022 | Lecompere et al. |
| 2022/0347917 | A1* | 11/2022 | Lecompere ........... B29C 64/264 |
| 2022/0350304 | A1 | 11/2022 | Lecompere et al. |
| 2023/0041524 | A1 | 2/2023 | Lecompere et al. |

FOREIGN PATENT DOCUMENTS

| | | |
|---|---|---|
| GB | 2477828 | 8/2011 |
| JP | H05-154924 | 6/1993 |
| JP | 2004-025843 | 1/2004 |
| JP | 2007-536131 | 12/2007 |
| JP | 2016-530127 | 9/2016 |
| JP | 2017-159557 | 9/2017 |
| WO | WO2017/055747 | 4/2017 |
| WO | WO2017/127334 | 7/2017 |
| WO | WO2019/002905 | 1/2019 |
| WO | WO2020/260305 | 12/2020 |
| WO | WO2020/260306 | 12/2021 |

OTHER PUBLICATIONS

International Search Report & Written Opinion issued in related application PCT/EP2020/054696, dated Jul. 3, 2020.
International Search Report & Written Opinion issued in related application PCT/EP2020/067538, dated Sep. 2, 2020.
Xu et al., "Mask Image Planning for Deformation Control in Projection-Based Stereolithography Process", Journal of Manufacturing Science and Engineering, vol. 137, Jun. 2015, 12 pages.
Rank et al., "3D Printing of Optics", ISBN: 9781510619982, 2018.
Vitale et al., "Frontal Conversion and Uniformity in 3D Printing by Photopolymerisation", *Materials*, 2016, (9)760, pp. 1-13.
Notice for Reasons for Rejection issued in corresponding Japanese Application No. 2021-549081, dated Oct. 3, 2023. (English Translation Provided).
Bennett, et al. "Measuring UV curing parameters of commercial photopolymers used in additive manufacturing", *Additive Manufacturing*, vol. 18, pp. 203-212, 2017.
Office Action issued in corresponding U.S. Appl. No. 17/621,514 issued Apr. 12, 2022.
Office Action issued in corresponding U.S. Appl. No. 17/621,510, dated Apr. 12, 2024.

* cited by examiner

METHOD FOR MANUFACTURING AN OPTICAL VOLUME ELEMENT FROM A CURABLE MATERIAL USING AN ADDITIVE MANUFACTURING TECHNOLOGY

CROSS-REFERENCE TO RELATED APPLICATIONS

This application is a national phase application under 35 U.S.C. § 371 of International Application No. PCT/EP2020/054696 filed 21 Feb. 2020, which claims priority to European Patent Application No. 19305218.0 filed 22 Feb. 2019. The entire contents of each of the above-referenced disclosures is specifically incorporated by reference herein without disclaimer.

TECHNICAL FIELD OF THE INVENTION

The invention relates to the manufacturing of optical components, for example ophthalmic lenses.

More precisely the invention relates to a method for manufacturing an optical element from a curable material using an additive manufacturing technology.

The invention also describes a manufacturing system for manufacturing an optical element from a curable material using an additive manufacturing technology.

BACKGROUND INFORMATION AND PRIOR ART

The additive manufacturing technologies are suitable for manufacturing many devices, particularly for manufacturing prototype devices within the framework of the development of new technologies as the final obtained device is directly formed with the required shape. However, in the current stage of development, the additive manufacturing technologies are rarely adapted to be used as an industrial tool for mass production of ophthalmic devices.

The additive manufacturing technologies suitable for ophthalmic devices are usually based on a building process layer-by-layer or drop-by-drop. The intended device is thus formed by the overlapping of the layers or the drops.

Regarding the manufacturing of ophthalmic lenses, especially for eyeglasses, the additive manufacturing technologies are used to produce models of ophthalmic lenses. However, these models are rarely adapted to be used in a frame in order to be worn by a wearer. Indeed, an accumulation, within the manufactured optical device, of the interfaces between the layers (or drops and/or the traces of pixels present within the irradiating tools) often forms slight optical defects, and in particular diffracting defects.

These defects appear at the interface between the layers, because the material located on either side of this interface has hardened at different times, which generates diffraction between the layers (it has been noted that the formation of an optical device with a stacking of a multiplicity of layers induces a repetition of a pattern, and such repetitive alternation of optical properties induces the formation of diffracting defects). Moreover, the hardening of the material in a single layer also occurs not uniformly but rather point by point, which also generates diffraction between these points.

These defects are critical when the ophthalmic lens is finally used.

SUMMARY OF THE INVENTION

The present invention provides a method for manufacturing.

More precisely, the invention consists in a method for manufacturing an optical element from a curable material using an additive manufacturing technology comprising steps of:
providing a first portion of curable material,
forming a first part of the optical element by irradiating the surface of the curable material of said first portion with a first curing surface energy, the first curing surface energy being strictly lower than a first predetermined energy threshold and higher than a second predetermined threshold, and
forming, after the irradiation of the first part with the first curing surface energy, at least a second part of the optical element, distinct from the first part of the optical element, by irradiating, with at least a second curing surface energy, the surface of the curable material, the second curing surface energy irradiating both the second part of the optical element and at least a portion of the first part of the optical element, the sum of the first curing surface energy and the portions of the at least second curing surface energy received by said first part of the optical element being higher than or equal to the first predetermined energy threshold.

More specifically, the invention consists in a method for manufacturing an optical element from a curable material using an additive manufacturing technology comprising steps of:
providing a first portion of uncured curable material,
forming a first part of the optical element by irradiating the surface of the curable material of said first portion with a first curing surface energy, the first curing surface energy being strictly lower than a first predetermined energy threshold and higher than a second predetermined threshold, the first predetermined energy threshold being lower than or equal to a solid predetermined energy threshold corresponding to an energy sufficient to make the first part of the optical element solid on the whole thickness of said first part of the optical element, the second predetermined energy threshold being equal to an induction surface energy, and
forming, after the irradiation of the first part with the first curing surface energy, at least a second part of the optical element, distinct from the first part of the optical element, by irradiating, with at least a second curing surface energy, said second curing surface energy being higher than the second predetermined energy threshold, the surface of the curable material, the second curing surface energy irradiating both the second part of the optical element and at least a portion of the first part of the optical element, the sum of the first curing surface energy and the portions of the at least second curing surface energy received by said first part of the optical element being sufficient to make the first part of the optical element solid, the sum of the first curing surface energy and the portions of the at least second curing surface energy received by said first part of the optical element being preferably higher than or equal to the solid predetermined energy threshold.

Thanks to the invention, at least some of the different parts of the optical element are not fully cured in one time. Some of them are not even fully cured before the complete manufacturing of the optical element. Indeed, the curing energy received in a single time by the curable material of the first part is not enough to completely harden it. The formed part is thus formed, at least initially, in an intermediate state between liquid and solid. Then, during the formation of some other parts of the optical element, at least one part previously formed receives an amount of curing energy that increases a conversion rate toward a solid state. In some cases, it is possible, according to the invention, that some of the parts receive enough curing energy to become solid only close to the end of the manufacturing of the optical element.

The first part being in an intermediate state when the second part receives the second curing energy, instead of being in a solid state, enables the two parts to merge more efficiently, thus reducing, or even avoiding, the traces of the interfaces between said parts. It is supposed that those adjacent parts interpenetrate better with the others. All the adjacent parts formed according to the invention, are thus linked to the others with more continuous material properties, thus limiting defects related to interfaces.

It is to be noted, that according to the invention, at least one pair of first part and second part are such that the first part and the second part is distinct parts of the optical element, and that at the end of the manufacturing of the optical element by additive manufacturing, including potentially a post curing, both the first part and the second part are entirely in the solid state.

It can be precised that, previously to said step of providing a first portion of uncured curable material, the method comprises a step of providing an initial portion of curable material which is at least partially cured, said first portion of uncured curable material being placed between said initial portion and an energy source suitable for irradiating the surface of the curable material with the first curing surface energy and the second curing surface energy. This clarifies that the first portion of curable material corresponds to the curable material enabling to form a layer according to the common understanding of the person skilled in the art.

Other advantageous features of the method are the following ones:
- the first predetermined energy threshold is determined for the first part of the optical element by using the Jacobs' equation defined as $\{E_J=E_C^*\exp\}$ with $E_J$ a Jacobs energy from which the first predetermined energy threshold derives, th a thickness of the first part of the optical element, $D_P$ a light depth penetration value of the first curing surface energy within the curable material, and $E_C$ a critical Jacobs energy defined for the curable material;
- the first predetermined energy threshold is determined for the first part of the optical element by using the Jacobs' equation defined as $\{E_J=E_C^*\exp\}$ with $E_J$ a Jacobs energy, the solid predetermined energy solid ($T_S$) being equal to said Jacobs energy, th a thickness of the first part of the optical element, $D_P$ a light depth penetration value of the first curing surface energy within the curable material, $E_C$ a critical Jacobs energy defined for the curable material, and the first predetermined energy threshold being a function of the critical Jacobs energy;
- the first predetermined energy threshold is the critical Jacobs energy defined for the curable material, the sum of the first curing surface energy and the at least second curing surface energy being higher than or equal to the Jacobs energy;
- the sum of the first curing surface energy and the at least second curing surface energy is higher than or equal to the Jacobs energy, preferentially higher than or equal to 1.2 times the Jacobs energy, preferably 1.5 times the Jacobs energy;
- the method comprises a number of steps of irradiating the surface of the curable material so that a part of a curing surface energy is received by at least a part of the first part of the optical element at each step of irradiation, each curing surface energy being higher than the second predetermined threshold, the sum of each curing surface energy received by the first part being higher than or equal to the first predetermined energy threshold, said number being an integer higher than or equal to 3. In other words the step of "forming, after the irradiation of the first part with the first curing surface energy, at least a second part of the optical element, distinct from the first part of the optical element, by irradiating, with at least a second curing surface energy" comprises a number of irradiations steps higher than or equal to 2, and the second part of the optical element may comprise more than 2 distinct sub parts of the optical element;
- the method is such that for at least a step of irradiating the surface of the curable material, said step of irradiating comprises a substep of irradiating at least partially said first part of the optical element with an intermediate curing surface energy, the sum of the first curing surface energy and the intermediate curing surface energy being strictly lower than the first predetermined energy threshold;
- the method comprises steps of providing a second portion of curable material between an energy source and the first part of the optical element, forming the second part of the optical element with said second portion of curable material, and irradiating the surface of the curable material with at least the second curing surface energy so that a part of the second curing surface energy is received by at least a part of the first part of the optical element. In other words, the second portion of curable material, and thus the second part of the optical element is in a different layer than the first part of the optical element and most generally a layer formed later in the manufacturing process;
- the step of forming the first part of the optical element comprises substeps of determining a first image pattern associated with a first set of pixels of an energy source suitable for applying the first curing surface energy, and projecting the first set of pixels of the energy source onto the surface of the curable material, the first set of pixels defining a first projected image;
- the step of forming the second part of the optical element comprises substeps of determining a second image pattern associated with a second set of pixels of an energy source suitable for applying the second curing surface energy, and projecting the second set of pixels of the energy source onto the surface of the curable material, the second set of pixels defining a second projected image;
- a relative position of the second set of pixels with regard to the first set of pixels being defined such that at least one pixel of the projected second set of pixels overlaying partially at least two pixels of the projected first set of pixels;
- the method comprises substeps of determining at least another image pattern associated with another set of pixels of an energy source suitable for applying another curing surface energy, projecting successively each set of pixels of the energy source onto the surface of the curable material with a relative position such that at least one pixel of the last projected set of pixels overlays partially at least two pixels of each previously projected set of pixels, the number of projected sets of pixels being an integer higher than or equal to 3;

the number of projected sets of pixels is higher than the number of steps of irradiating;

the relative positions of the sets of pixels between the projected images are determined in order to minimize the variation of hardening surface energies received by the first part of the optical element;

the number is determined so that a total curing surface energy received by any point of the first part of the optical element is at least equal to the first predetermined energy threshold, preferentially critical Jacobs energy (Ec);

the method comprises a step of post-processing once the optical element is obtained, the step of post-processing comprising a step of subtractive machining like polishing or a step of additive working like coating;

the additive manufacturing technology comprises one of a stereolithography technology or a polymer jetting technology;

the optical element is an ophthalmic lens;

the first and second parts of the ophthalmic lens are superimposed along an axis roughly orthogonal to an optical axis of the ophthalmic lens.

The invention also relates to a manufacturing system for manufacturing an optical element from a curable material using an additive manufacturing technology comprising:
a container suitable for containing a curable material,
a support suitable for supporting the optical element, and
a forming unit programmed to forming a first part of the optical element by irradiating the surface of the curable material with a first curing surface energy, the first curing surface energy being strictly lower than a first predetermined energy threshold and higher than a second predetermined threshold, the forming unit being also programmed to form at least a second part of the optical element by irradiating the surface of the curable material overlapping at least partially said first part of the optical element with at least a second curing surface energy, the sum of the first curing surface energy and the second curing surface energy being higher than or equal to the first predetermined energy threshold.

More specifically, the invention also relates to a manufacturing system for manufacturing an optical element from a curable material using an additive manufacturing technology comprising:
a container suitable for containing an uncured curable material,
a support suitable for supporting the optical element, and
a forming unit programmed to forming a first part of the optical element by irradiating the surface of the curable material with a first curing surface energy, the first curing surface energy being strictly lower than a first predetermined energy threshold and higher than a second predetermined threshold, the first predetermined energy threshold being lower than or equal to a solid predetermined energy threshold corresponding to an energy sufficient to make the first part of the optical element solid on the whole thickness of said first part of the optical element, the second predetermined energy threshold being equal to an induction surface energy, the forming unit being also programmed to form at least a second part of the optical element by irradiating the surface of the curable material overlapping at least partially said first part of the optical element with at least a second curing surface energy, said second curing surface energy being higher than the second predetermined energy threshold, the sum of the first curing surface energy and the second curing surface energy being sufficient to make the first part of the optical element solid, the sum of the first curing surface energy and the portions of the at least second curing surface energy received by said first part of the optical element being preferably higher than or equal to the solid predetermined energy threshold.

According to a preferred embodiment, the system comprises a shifting unit suitable for programmed to shift the support in relation to the forming unit in order to shift the formed first part of the optical element along an axis roughly orthogonal to the surface of the curable material.

According to a preferred embodiment, the forming unit comprises an energy source suitable for irradiating the surface of the curable material with the first curing surface energy and the second curing surface energy.

According to a preferred embodiment, the forming unit comprises:
computer element programmed to determine a first image pattern associated with a first set of pixels of the energy source suitable for applying the first curing energy, the computer element being also programmed to determine a second image pattern associated with a second set of pixels of the energy source suitable for applying the second curing surface energy and
optical system suitable for projecting the first set of pixels of the first curing surface energy onto the surface of the curable material, the first set of pixels defining a first projected image, the optical system being also suitable for projecting the second set of pixels of the energy source onto the surface of the curable material, the second set of pixels defining a second projected image.

DETAILED DESCRIPTION OF EXAMPLE(S)

The following description with reference to the accompanying drawings, given by way of non-limiting example makes it clear what the invention consists in and how it can be reduced to practice.

Figure 2:
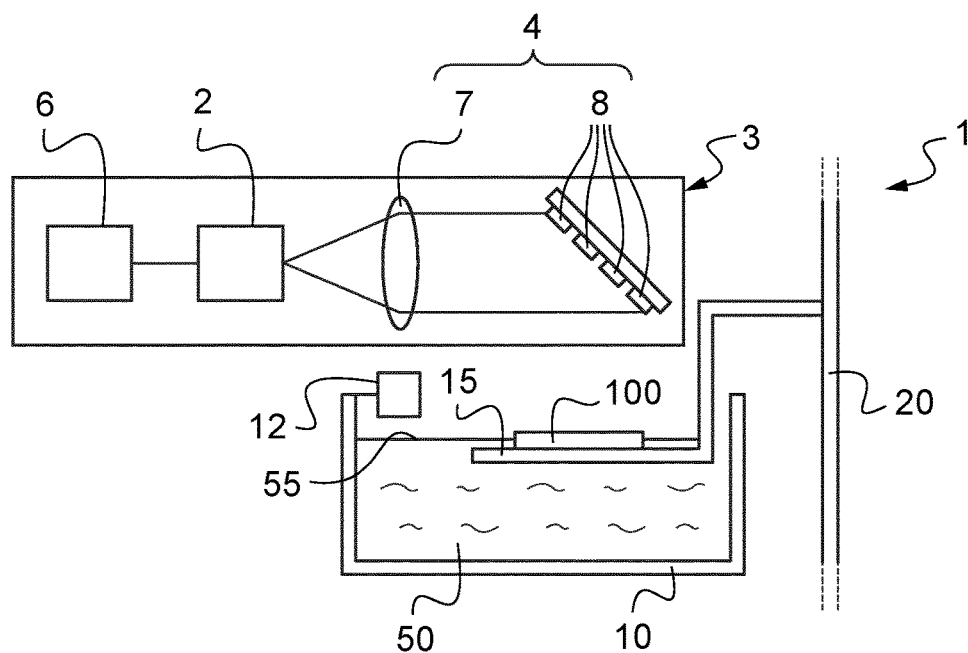
Figure 3:
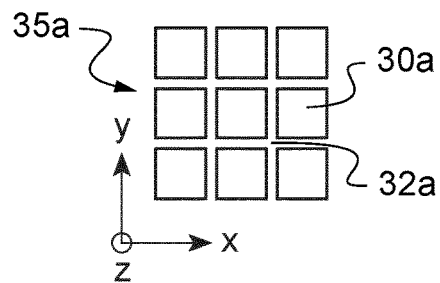
Figure 4:
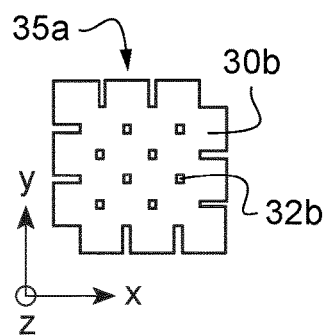
Figure 5:
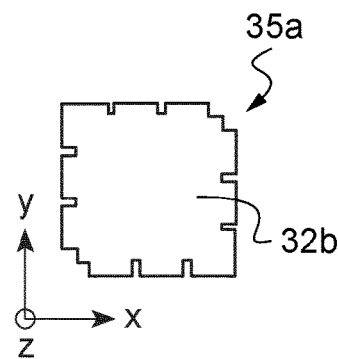
Figure 6:
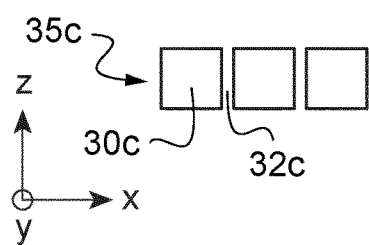
Figure 7:
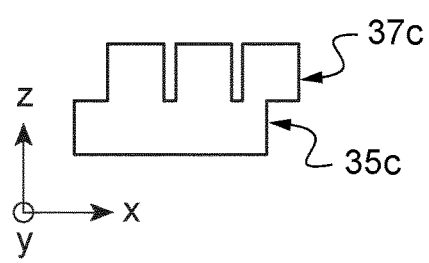
Figure 8:
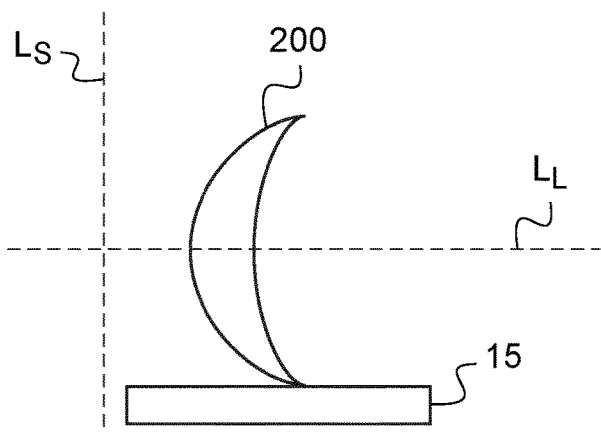
Figure 9:
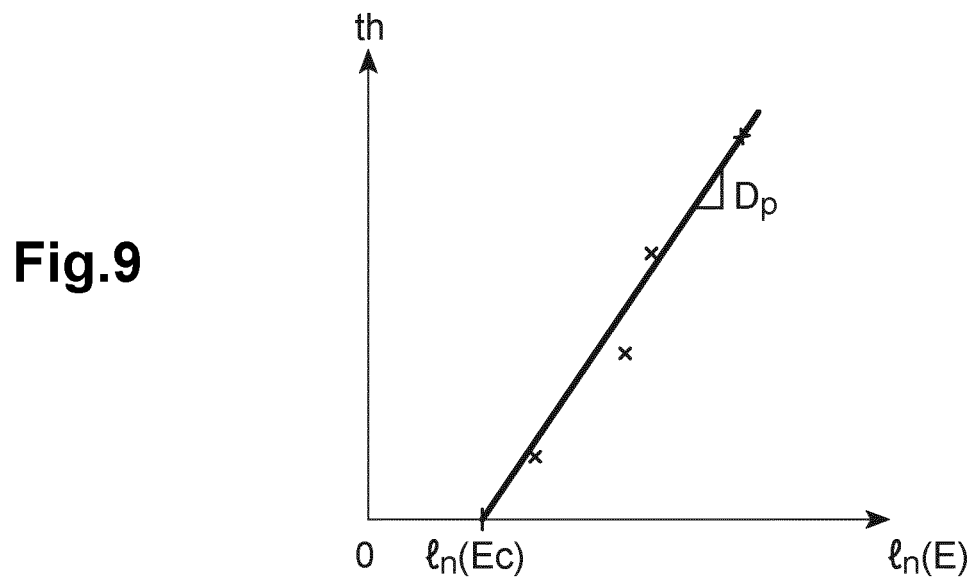
Figure 10:
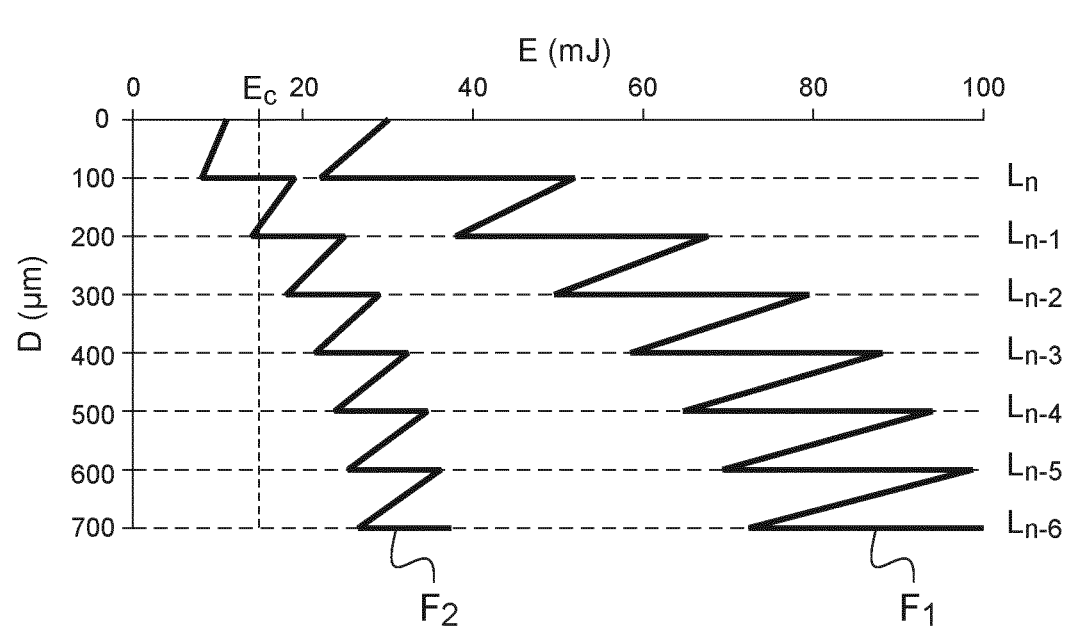
Figure 11:
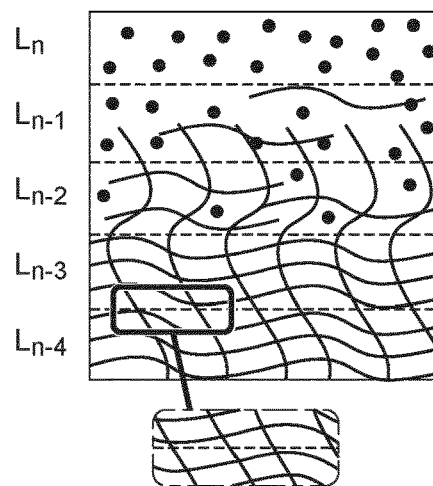
Figure 12:
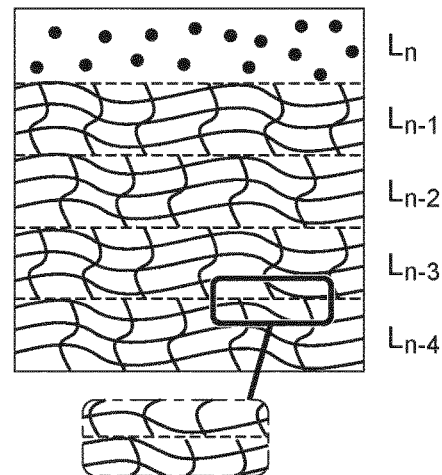
Figure 13:
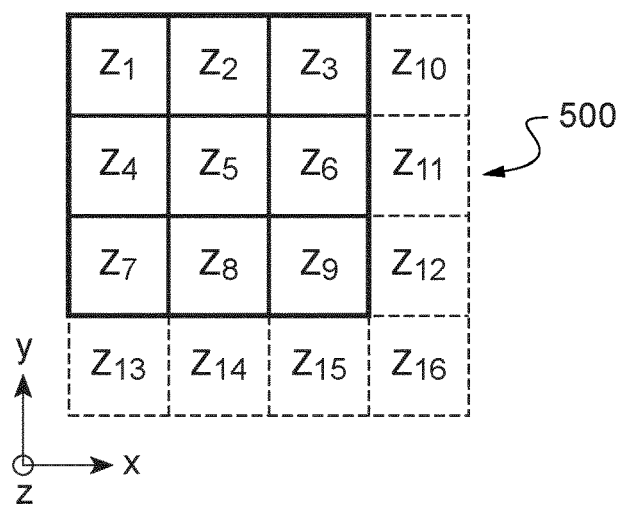
Figure 16:
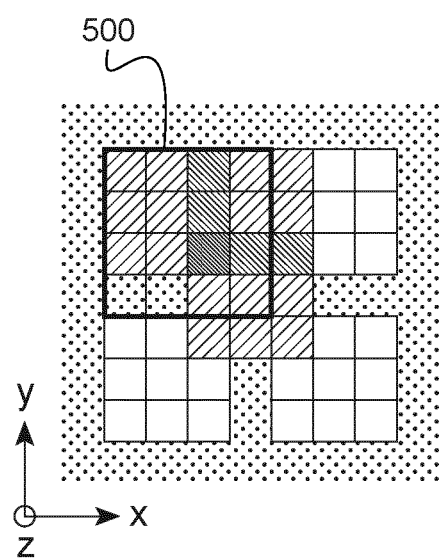
Figure 17:
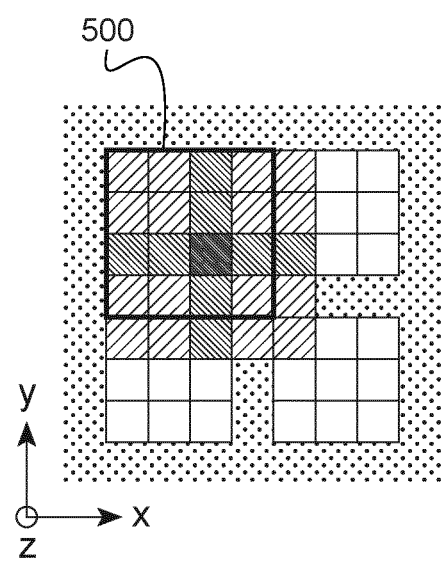
Figure 18:
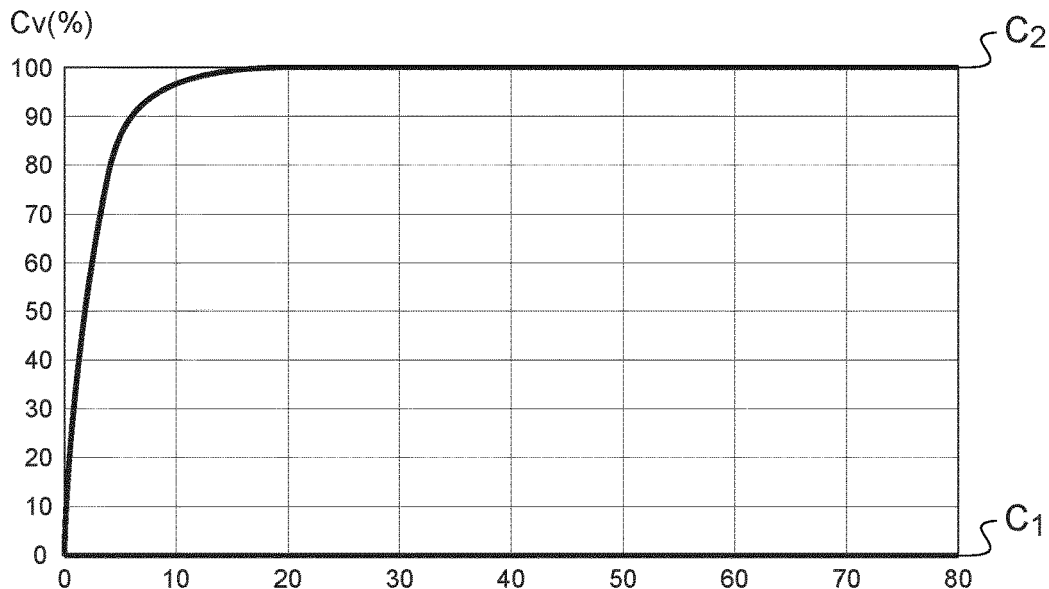
Figure 19:
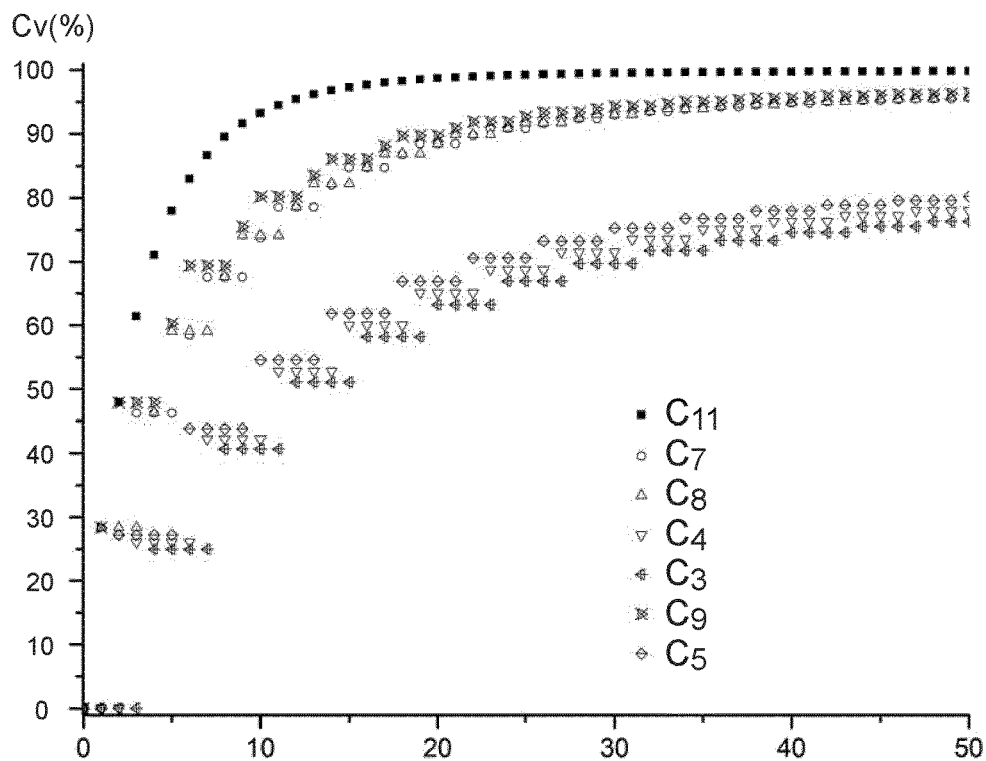
Figure 20:
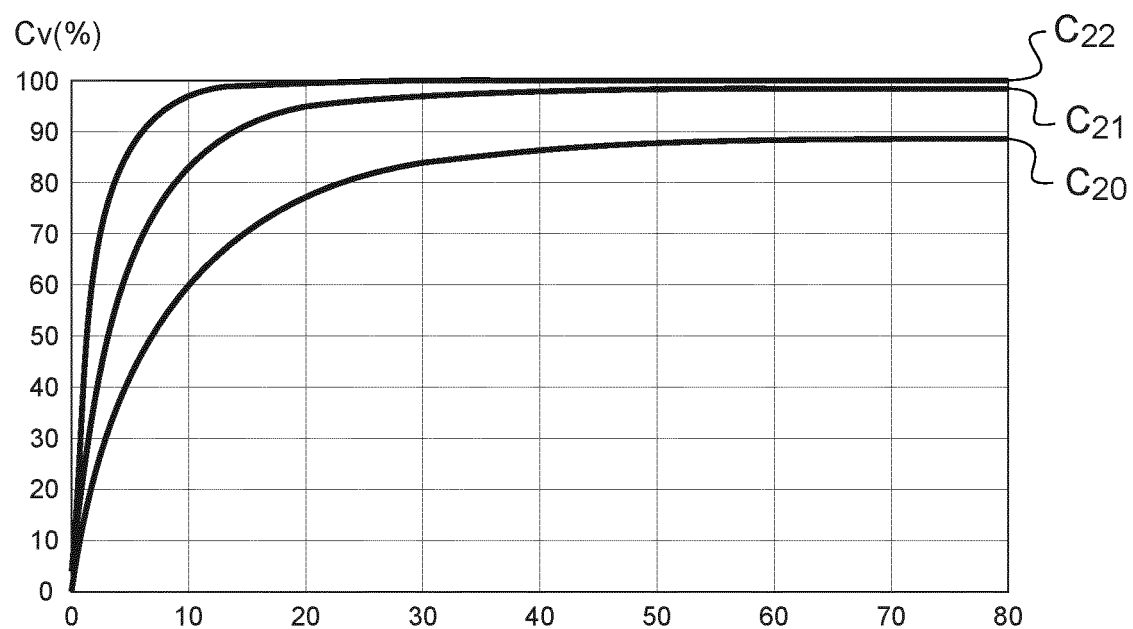

In the accompanying drawings:
FIG. 1 represents a curve showing the conversion rate of a curable material as a function of the curing surface energy;
FIG. 2 represents an exemplary manufacturing system adapted to manufacture an optical element according to the invention;
FIGS. 3 to 5 schematically show different top views of the curable material of an optical element when it is processed according to a first embodiment of the invention;
FIGS. 6 and 7 schematically shows side views of the curable material of an optical element when it is processed according to a second embodiment of the invention; and
FIG. 8 represents an ophthalmic lens manufactured according to the method of the invention;
FIG. 9 represents an example of a working curve according to the Jacobs' equation;
FIG. 10 represents the transmission of two curing surface energies irradiating the curable material through the thickness of an optical element according to the invention;

FIGS. 11 and 12 respectively show the arrangement of the curable material in the case of the present invention and in the case of the prior art;

FIG. 13 a subdivision of a pixel zone according to the invention;

FIGS. 14 to 17 show successive projections of sets of pixels on areas defined in FIG. 13; and FIGS. 18 to 20 show the evolution of the conversion rate as a function of the successive irradiations in three examples according to the invention.

The present invention relates in general to a method adapted to manufacture an optical element using an additive manufacturing technology.

The invention applies more particularly to the manufacturing of an ophthalmic lens, for example suitable for being mounted in an eyeglass frame. The ophthalmic lens is potentially manufactured already to a shape adapted for being mounted in the eyeglass frame, or needing a further edging step in order to reach the required shape.

The expression "additive manufacturing technology" refers to a manufacturing technology as defined in the International standard ASTM 2792-12, which mentions a process of joining materials to make objects from 3D model data, usually layer upon layer, as opposed to subtractive manufacturing methodologies, such as traditional machining. Solid objects are thus manufactured by juxtaposing volume elements (mainly layers or voxels, or drops, or droplets, or, in some cases even blocks of matter). In the case of the present invention, the optical element is thus manufactured volume element by volume element, preferably layer by layer.

The additive manufacturing technology may be in practice stereolithography (SLA), digital light processing stereolithography (DLP-SLA) or polymer jetting. Additive manufacturing technologies comprise processes which create objects by juxtaposition of volume elements according to a pre-determined arrangement that can be defined in a CAD (Computer Aided Design) file.

Stereolithography (SLA) and digital light processing stereolithography (DLP-SLA) both work by focusing a light, mostly an ultraviolet light, onto a container of photopolymer liquid resin in order to form solid layers that stack up to create a solid object. Regarding stereolithography (SLA), the liquid resin receives a selective exposure to light by a laser beam scanning the print area. Digital light processing stereolithography (DLP-SLA) uses a digital projector screen to project an image of each layer across the entire surface of the resin. As the projector is a digital screen, the image of each layer is composed of sensibly square pixels, resulting in a layer formed from small rectangular bricks called voxels (volume defined by the square pixel and the thickness of the layer).

As an alternative, the pixels may have other shapes, such as being hexagonal, rhombus or elongated depending on the technology used to form the micro-mirrors, for example the LCD or LED pixels.

A polymer jetting technology uses an inkjet print head to jet droplets of liquid photopolymer resin onto a build platform. The liquid resin is immediately cured by a light source, such as an infrared source or an ultraviolet source, and solidified in order to build layers, or the final optical element, set of droplets by set of droplets (and form the solid object).

In practice here, the additive manufacturing technology used is based on the projection of a light pattern on a curable material. The light pattern is for example an infrared pattern or an ultraviolet pattern. The curable material is for example a photopolymer resin and the optical element is manufactured by a photopolymerization process. As an example, the photopolymer resin comprises (meth)acrylate monomers.

In practice, the photopolymerization process can be characterized by a conversion rate $C_v$ (or polymerization rate) of the curable material. The conversion rate $C_v$ is linked to the physical state of matter of the curable material. Before being irradiated by the curable energy, mostly irradiation by light, the curable material is liquid. The conversion rate $C_v$ is considered close to 0, not withstanding a slight polymerization due to aging of the curable material. Under the irradiation of the curable material by the curable surface energy, the curable material polymerizes and switches progressively from a liquid state to a solid state. The curable material is going through multiple states, especially an intermediate state, called "gel state", which corresponding conversion rate $C_v$ depends of the curable material. The intermediate state corresponds to a matter state which is neither liquid nor solid but between them, in particular, not solid enough according to the method according to the methodology of Jacobs, but with monomer having started to polymerize with each other, starting to form parts of a polymer network. The conversion rate $C_v$ of the intermediate state may for example be between 20% and 80% for some acrylate monomers, or higher than 10% and/or lower than 67% for some others. The curable material is considered to be in a solid state for a conversion rate $C_v$ generally higher than 80%. For some acrylate monomers, the curable material is considered to be in a solid state for a conversion rate $C_v$ higher than 67%. Depending on the material, the curable material is considered to be in a solid state for conversion rates higher than a critical conversion rate which may be empirically determined between about 60% to about 80%.

The conversion rates characterizing the intermediate state and the solid state depend on a curing surface energy E (or light dose) derived from the light source, on the absorption properties of the curable material, and on the efficiency of initiator to polymerize the curable material. FIG. 1 represents the conversion rate $C_v$ (in %) as a function of the curing surface energy E which irradiates the curable material in the case of acrylate monomers.

As visible in this FIG. 1, in some cases, especially for radical chain growth polymerization, as long as the curing surface energy E is lower than an induction surface energy $E_I$, the conversion rate remains close to 0. During this period (called the "induction period"), the curable material remains liquid and the polymerization does not occur. In the case of a radical chain growth polymerization, the reaction between the primary radicals formed by activation of initiators and the monomers is quenched by an inhibitor, here the dioxygen, that reacts preferentially with said radicals thus preventing reacting with monomers. During the induction period, the curing surface energy E received by the curable material is thus used to consume the inhibitor, here dioxygen. When the curing surface energy E received by the curable material reaches the induction surface energy $E_I$, the polymerization process occurs.

It is to be noted that some polymerization processes do not have an induction period, such as some cationic-chain growth polymerization. In such cases, the invention still applies, with the induction surface energy which is negligible (in this case, the "second curing surface energy threshold", that will be defined hereafter, will be negligible too).

As long as the total received curing surface energy remains lower than a critical Jacobs energy $E_C$, while the polymerization process progresses and the conversion rate $C_v$ increases (with the conversion of monomers), the curable material remains in non solid state but becomes sturdier and sturdier.

The critical Jacobs energy $E_C$ is defined as the minimum surface energy to provide to reach a state solid enough to print a layer with a theoretical thickness of 0. As the curing surface energy is linked to the matter state, a corresponding conversion rate $C_v$ is paired with the critical Jacobs energy $E_C$ for a given material. In some cases of acrylate monomers polymerized by radical chain growth polymerization, the corresponding conversion rate $C_v$ is around 60% to 80%.

The critical Jacobs energy $E_C$ is determined using an empirical method based on the Jacobs' equation (Paul F. Jacobs, *Fundamentals of stereolithography in International Solid Freeform Fabrication Symposium*, 1992): $\{th = D_P * \ln(E/E_C)\}$, with E the curing surface energy, $E_C$ the critical Jacobs energy, $D_P$ a light depth penetration value of the curing surface energy within the curable material and th the polymerized thickness.

The light depth penetration value $D_P$ and the critical Jacobs energy $E_C$ are obtained from a working curve derived from Jacobs' experiments. The experiment consists in irradiating a curable material (here a resin) with a set of known curing surface energies and measuring the corresponding polymerized thickness of measurably solid material. The working curve is a semi-logarithmic plot of the measured thickness polymerized as a function of the natural logarithm (ln) of the curing surface energy E.

FIG. 9 represents an example of such a working curve. As visible in this Figure, the working curve is a straight line. The light depth penetration value $D_P$ is the slope of the working curve and the critical Jacobs energy $E_C$ is the the intersection between the abscissa axis and the working curve.

Above the critical Jacobs energy $E_C$, the curable material start to form a measurable solid part where it is no required to increase more the monomer conversion to get a solid polymerized material, even if an increased conversion may further change the physical and/or optical properties. Accordingly, for non-null thicknesses of material, as long as the total received curing surface energy remains lower than a Jacobs energy $E_J$, while the polymerization process progresses and the conversion rate $C_v$ increases, the layer expected of curable material is in a gel state and becomes sturdier and sturdier.

The Jacobs energy $E_J$ corresponds to the minimum curing surface energy to provide, for a given curable material, of a given thickness, to harden the whole given thickness into a state solid enough to be measured according to the methodology of Jacobs. The Jacobs energy $E_J$ is obtained from Jacobs' equation following a set of the critical Jacobs energy $E_C$, the light depth penetration value $D_P$ corresponding to the curable material, and an expected thickness of layers th. In the case of acrylate monomers cured by radical chain growth polymerization process, the corresponding conversion rate $C_v$ is usually around 60% to 80%. According to this range for the conversion rate, it is to be noted that it is no required to increase more the monomer conversion to get a solid polymerized material, even if an increased conversion may further change the physical and/or optical properties.

It is to be noted that within conventional practices in 3D printing in other domains than ophthalmic lens manufacturing, the curing surface energy applied to a given layer is set higher than the Jacobs energy $E_J$, generally providing enough energy to harden into a solid state a layer having a thickness increased by about 50% to about 200%. In other words, the Jacobs energy $E_J$ may be comprised between the critical Jacobs energy $E_C$ for a layer 150% thicker than the considered layer and the critical Jacobs energy $E_C$ for a layer 300% thicker than the considered layer. The present invention put aside these practices in order to reach the optical requirements for ophthalmic application.

FIG. 2 shows a manufacturing system 1 adapted to manufacture an optical element by way of a DLP-SLA process. The manufacturing system comprises a forming unit 3, a container 10, a support 15 and shifting means 20. The forming unit 3 comprises an energy source 2, an optical system 4, and a computer element 6. The forming unit 3 is adapted to implement a method for manufacturing an optical element 100 as described below when the instructions are executed. In practice, the computer element 6 includes a microprocessor and a memory (not represented). The microprocessor is adapted to execute the instructions to manufacture the optical element 100 and the memory stores these instructions. As an example, the computer element 6 is programmed to generate instructions regarding the magnitude of the curing surface energy for each successive step of providing a curing surface energy, and regarding image patterns (or light patterns) that will be projected on the surface 55 of the curable material 50. These instructions are for example transmitted to the energy source 2 and/or to the optical system 4.

The energy source 2 is suitable for irradiating the surface 55 of the curable material 50 with a curing surface energy. The energy source 2 provides a light beam, for example, an ultraviolet light beam, directed to the curable material 50 by the optical system 4.

The optical system 4 are adapted to project the light coming from the energy source 2 onto the surface 55 of the curable material 50. The optical system 4 comprises a plurality of micro-mirrors 8 arranged into a grid format. The micro-mirrors 8 are separated from each other by an interspace (as in practice, it is not possible to have a perfect junction between two adjacent micro-mirrors). A micro-mirror 8 is for example in a sensibly square-shape, with a size of for example 8×8 μm². The interspace is comprised between 1 and 10 μm, for example around 2.8 μm, for a pitch between micro-mirrors of about 10.8 μm. Once projected onto the surface 55 of the curable material 50, the micro-mirrors 8 form projected pixels with a given pitch, comprising a direct projection of the micro-mirrors and of the interspace For example the pitch may be of about 40×40 μm, with about 30×30 μm corresponding to a projection of the micro-mirrors, separated by an interspace of about 10 μm.

It is to be noted that other alternative combinations of energy source and optical system exist. For example, the formation of the image pattern may be generated entirely by the energy source, using micro-mirrors or an LCD or LED screen, and the optical system only provides positioning and focusing effects. Alternatively, the energy source may provide energy in a continuous or regular burst manner, and the optical system generates the image pattern on top of positioning and focusing effect. Further, the size of the micro-mirrors or LCD or LED pixels or of the projected pixels may vary from the current example without disparaging from the invention.

As visible in FIG. 2, the optical system 4 comprises here a projection system 7 adapted to direct the ultraviolet beam from the energy source 2 to the plurality of micro-mirrors 8.

The curable material 50 is stored in the container 10 in a liquid state. Once polymerized, the curable material 50 forms the optical element 100 which is born by the support 15. In practice, the support 15 is partly immersed in a vat of curable material 50 such that a portion of the liquid curable material 50 is on the top of the support 15. The light beam provided by the energy source 2 is thus projected on this portion of the curable material 50. When this portion is polymerized, the part of the optical element which is formed is thus on the support 15.

As described in the following, according to the invention, the optical element is formed in several parts (in the described embodiments, in several layers).

First, an initial portion of curable material 50 is used to form the optical element 100. This initial portion is at least partially cured before another portion (named "first portion") of uncured curable material is deposited onto this initial portion. Then, a first part of this first portion is cured.

The cured part of the initial portion is used as a mechanical basis for this first part of the optical element 100.

In other words, according to the invention, a first portion of uncured curable material is placed on the initial portion (namely between the initial portion and the energy source 2 suitable for irradiating the surface of the curable material).

In this specification, the term "uncured" refers to a fresh curable material that is not polymerized at all. The first part is then formed by irradiating this first portion of uncured curable material.

As the first part, the cured part of the initial portion is at the end an integral part of the optical element.

It is to be noted that the support may comprise support beams or structures formed by cured curable material to support the lens.

The manufacturing system 1 also comprises the shifting means 20. The shifting means 20 is suitable for shifting the support 15 on which the optical element 100 is formed with regard to the vat of curable material. This shifting means 20 allows a vertical movement of the support 15, relative to the vat of curable material, along an axis sensibly orthogonal to the surface 55 of the curable material 20. This vertical movement of the support 15 allows controlling the thickness of liquid curable material 50 to polymerize. The shifting means 20 thus allows controlling the thickness of the polymerized layer.

The shifting means 20 also allows, in the current example, a horizontal movement, along an axis sensibly parallel to the surface 55 of the curable material 50.

As represented in FIG. 2, the manufacturing system 1 comprises here a recoater device 12. This recoater device 12 is for example suitable for spreading some curable material on the top of a previous layer of curable material. Alternative methods do not use a recoater and may position a membrane on the surface of the curable material to achieve flatness of the material and control the thickness of curable material added on top of a previous layer of curable material.

As introduced previously, the optical element 100 is manufactured, according to the invention, by irradiating the curable material 50 with a curing surface energy.

In practice, the irradiation is based on an image pattern associated with a set of pixels within the energy source 2 or the optical system 4, in the form of LCD or LED pixels or micro-mirrors such as digital micro-mirror devices (DMD). This set of pixels is projected on the surface of 55 the curable material by the forming unit 3. However, as previously presented, in practice, the micro-mirrors 8 are not perfectly joined and there are some interspaces between them. The projected image on the surface of the curable material thus comprises some shadowed areas corresponding to the interspaces. These shadowed areas are less irradiated by the curing surface energy. These shadowed areas thus correspond to areas which are less polymerized. The repetition of such regular variation of the polymerization rate within a same layer and repeated layer after layer leads to the formation of observable diffraction defects. Such defects are incompatible with the expected optical quality of spectacle lenses.

It is to be noted that for the purpose of illustration, the mechanism is simplified and it is considered hereafter that the shadowed areas corresponding to the projection of the interspace for a given image pattern are not irradiated and do not polymerize during the irradiation linked to said image pattern. However the invention is not bound by this illustration and the example described using this simplified mechanism applies mutatis mudantis to cases where the shadowed areas receive curable surface energy and where thus the corresponding curable material may polymerise. In those cases, it is still to be noted that the shadowed area comprises some material that is not as well polymerized as under the direct projection of the micro-mirrors or LCD or LED pixels.

Indeed, the inventors have noted that even in cases where the curable surface energy is very high, and that the shadowed area receive enough surface energy to become solid in the meaning of Jacobs during the irradiation of single projection of an image pattern, the polymerization rate, and/or pace, of the shadowed area is lower than in the area corresponding to the direct projection of the micro-mirrors, leading to the formation of observable diffracting defects. Further, as the kinetic of polymerization is different within the shadowed areas and the areas under the direct projection of the micro-mirrors, called bright areas, the polymer network is different between the shadowed areas and the bright areas, thus leading to different optical properties. This thus leads to a periodical variation of optical properties having a spatial frequency corresponding to the pitch of the projected pixels.

In this specification, a pixel is defined as the image on the curable material surface of a micro-mirror 8 and half of the interspace between two adjacent micro-mirrors localized around the considered micro-mirror 8.

The present invention beneficially allows a homogeneous polymerization for the manufacturing of the optical element 100. Two exemplary embodiments are executed according to the invention.

A first embodiment is represented in FIGS. 3 to 5. The first embodiment is for example principally performed through one layer of curable material 50. It can for example be principally performed in the first formed layer of the optical element 100 or in another layer formed on the top of others.

According to the example showed in FIGS. 3 to 5, the first embodiment is here principally executed on a first formed layer of the optical element 100. According to this first embodiment, an initial image pattern and the associated initial set of pixels are determined for applying a first curing surface energy $E_1$ on the surface 55 of the curable material. The first curing surface energy $E_1$ is strictly lower than a first predetermined energy threshold $T_1$.

The first predetermined energy threshold $T_1$ is lower than or equal to a solid predetermined energy threshold $T_S$. The solid predetermined energy threshold $T_S$ corresponds to an energy to have a sufficient "green strength", which means an energy sufficient to cure the first part of the optical element 100 enough in order to handle it but lower than an energy to full cure it. The first part of the optical element 100 is for example formed by a single layer. The term "green" refers here to an initially formed photopolymerized object as opposed to the final object, which is subjected to additional thermal curing after an additive manufacturing process.

More details about this energy threshold $T_S$ can be found in the article "Polymers for 3D Printing and Customized Additive Manufacturing", Samuel Clark Ligon, Robert Liska, Jürgen Stampfl, Matthias Gurr, and Rolf Mülhaupt, Chemical Reviews 2017 117 (15), 10212-10290, DOI: 10.1021/acs.chemrev.7b00074.

In other words, the solid predetermined energy threshold $T_S$ corresponds to an energy sufficient to make the first part of the optical element 100 solid on the whole thickness of said first part of the optical element 100.

Furthermore, the solid predetermined energy threshold $T_S$ is strictly higher than the induction surface energy $E_I$, for example is higher than twice the induction surface energy $E_I$. This solid predetermined energy threshold $T_S$ is sufficient to obtain a part which is more solid than a part which is not polymerized yet.

The first predetermined energy threshold $T_1$ is a function of the critical Jacobs energy $E_C$, for example is equal to the critical Jacobs energy $E_C$. As another example, the first predetermined energy threshold $T_1$ is a recommended energy $E_J$, also called Jacobs energy $E_J$ in the following, derived from the Jacobs' equation previously introduced (by definition of the Jacobs' equation, the Jacobs energy $E_J$ is higher than the critical Jacobs energy $E_C$). As an example, the solid predetermined energy threshold $T_S$ is equal to the Jacobs energy $E_J$.

The first curing surface energy $E_1$ is higher than a second predetermined energy threshold $T_2$. In practice, this second predetermined energy threshold $T_2$ is equal to the induction surface energy $E_I$ previously introduced (the polymerization is thus occurring, the inhibiting dioxygen being already consumed in majority).

As an illustrative example, a curable material based on acrylate monomers with experimentally determined values of critical Jacobs energy $E_C$ of 5 mJ and light depth penetration value $D_P$ of 200 μm is considered. In order to build layers with a thickness of 10 μm, the first threshold would thus be $T_1=5.26$ mJ ($=E_J$). The second threshold would be about $T_2=0.21$ mJ.

In this example, the first curing energy could $E_1$ is chosen equal to $E_1=1.66$ mJ for reaching the first predetermined energy threshold $T_1$ in 4 different irradiations.

This initial set of pixels is projected on the surface 55 of the curable material 50 which is above the support 15. An initial layer 35a is formed. However, as the first curing surface energy $E_1$ is strictly lower than the critical Jacobs energy $E_C$, the curable material that is irradiated is not in a solid state, but is in an intermediate state between liquid state and solid state.

FIG. 3 shows an example of a top view of a trace of the projected image on the curable material 50. This trace shows an alternating of intermediate state areas 30a (that were directly irradiated and for which the polymerization is occurring) and of underpolymerized areas 32a (that are not directly irradiated). The underpolymerized areas 32a correspond to the shadowed areas previously described and derive from the interspaces between the micro-mirrors 8, and are, in this example, non-polymerized. It is reminded that this example is a simplified version of what happens in reality. It is expected that with most polymerized materials, the underpolymerized areas are still partly irradiated, either by diffusion of light or by a dispersion of a virtual light beam corresponding to the pixel or by migration of active species from the pixel to the shadowed areas or by other means.

In order to cover the whole surface of the curable material with a similar amount of curing surface energy (and thus to polymerize as homogeneously as possible the whole initial layer 35a), several sets of pixels thus need to be projected successively on the same surface of the curable material. Several other corresponding curing surface energies are thus directly applied successively on the initial layer 35a (before adding a new layer of curable material onto this initial layer 35a). Each of the other curing surface energies are higher than the second predetermined energy threshold $T_2$ and strictly lower than the first predetermined energy threshold $T_1$. Preferably, each of the other curing surface energies are strictly lower than the critical Jacobs energy $E_C$. The other curing surface energies are determined in order to polymerize the whole initial layer (in other words to get a high conversion rate in a major part of the initial layer 35a, for example higher than 0.70). The other curing surface energies are thus determined such that the sum of the first curing surface energy $E_1$ and each other curing surface energies received by the initial layer 35a is sufficient to make the initial layer 35a solid. In particular, the sum of the first curing surface energy $E_1$ and each other curing surface energies received by the initial layer 35a is higher than the solid predetermined energy threshold $T_S$. Preferentially, the sum of the first curing surface energy $E_1$ and each other curing surface energies received by the initial layer 35a is higher than or equal to 1.2 times the Jacobs energy ($E_J$), preferably 1.5 times the Jacobs energy ($E_J$). As previously introduced, a voxel is a volume element formed by a square pixel and the thickness of a layer.

In order to compensate the shadowed areas, each projected set of pixels is shifted from the ones previously projected by a distance smaller than the pixel size (or pitch). In other words, it means that a relative position of a projected set of pixel is defined with regard to another projected set of pixels such that at least one pixel of the projected set of pixels overlays at least partially two pixels of the other projected set of pixels. This overlapping allows smoothing the polymerization with a limited number of projected sets of pixels. Advantageously, especially if the pixels are sensibly square or have a rhombus shape or are sensibly rectangle, there are at least 3 projected set of pixels, each pixels having shadowed areas at least along 2 directions, forming thus an x axis and an y axis. The three sets of pixels are such that at least one projected set of pixel is such that it is shifted along both x and y axis with regard to at least one of the other projected sets of pixels.

According to the first embodiment, a number n of projected sets of pixels in order to cover the entire surface of the curable material is determined. The number n, along with n corresponding shifts, is optimised in order to minimize the variation of state of matter or conversion rate in the initial layer once irradiated by the n curing surface energies according to the n projected set of pixels, and to further minimize, when possible, the variation of the kinetic of the polymerization (the kinetic of the polymerisation corresponding to the curing pace imposed to the curable material). In other words, the relative positions of each projected set of pixels among the n projected sets of pixels (and thus the n associated projected images) are determined in order to minimize the variation of the total curing surface energies received among each voxel of the initial layer 35a, including the various shadowed areas, when all the curing steps are achieved. In practice, the number n depends on a target resolution in homogeneity (regarding the polymerization).

In this first embodiment, the number n is an integer equal to or higher than 3. In other words, it means at least three projected set of pixels (and thus a combination of at least three curing surface energies) are required to polymerize the initial layer 35a.

In practice, the arrangement of all the relative positions of the projected sets of pixels can define a cycle allowing the covering of the whole surface of the curable material. As an example, the cycle can be square-shaped or rhombus-shaped or triangle-shaped.

In the example represented in FIGS. 3 to 5, the number n is equal to 3, meaning that three projected sets of pixels (and thus three corresponding projected images) are required to homogeneously polymerize the surface 55 of the curable material available on the top of the support 15.

FIG. 4 represents the superposition of the projection of a second set of pixels overlapping the projected initial set of pixels. The projection of the second set of pixels is shifted from the first projected set of pixels, of about half a pixel pitch along an x axis, and half a pixel pitch along a y axis. In practice, the support 15 can be moved in order to obtain this shift between the two sets of pixels. As an alternative, the settings of the optical system 4 can introduce the shift.

As visible in FIG. 4, a major part of the surface of the curable material is polymerized as visible with the intermediate state areas 30b (the sum of the first and a second curing surface energies is lower than the first predetermined energy threshold $T_1$ for some voxels of the initial layer). However, some underpolymerized areas 32b still remain (the underpolymerized areas located at the borders are considered in the following).

FIG. 5 represents the superposition of a third set of pixels above the second set of pixels. The projection of the third set of pixels is shifted from the first and the second sets of pixels in order to cover the underpolymerized areas 32b, of about a third of a pixel pitch along an x axis, and a third of a pixel pitch along an y axis, with regard to the first set of pixels. In this Figure, the whole central area of the initial layer 35a has been irradiated at least once. In practice, some areas, which were localized at the crossing of the three projections of the first, second and third sets of pixels, are actually polymerized as a total received energy is higher than the first predetermined energy threshold $T_1$. However, some of the previous unpolymerized areas 32b received only one or two irradiations with a total received curing energy that is strictly lower than the first predetermined energy threshold $T_1$. The previous underpolymerized areas 32b are thus still in an intermediate state after the projection of the third set of pixels. In practice, these areas will be more polymerized with the formation of one or more layers overlapping the initial layer 35a. However, as compared with a process where the Jacobs energy $E_J$ is provided in one time, using only one set of pixels, the central area 35a according to the present embodiment shows an improved homogeneity of conversion rate, and of the kinetic of the polymerization. In this first embodiment, the other layers are formed the same way as the initial layer 35a.

In order to develop another illustrative example of this first embodiment, the pixel zone 500 is subdivided in 9 areas and the associated interpixel zone is divided in 7 areas. This subdivision is represented in FIG. 13, thus defining 16 different areas $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, $Z_{16}$. A projected set of pixels as previously defined covers 9 areas at the same time (as shown by the hatched areas in FIG. 13).

In this variant of the first embodiment, the number n is an integer equal to 4. In other words, it means four projected set of pixels (and thus a combination of four curing surface energies) are required to polymerize the initial layer.

Considering, with regard to the pixel zone 500 only, the successive projection of these four sets of pixels, FIGS. 14 to 17 shown the areas among the 16 areas $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, $Z_{16}$ which are successively irradiated. Here, we focus on the 16 areas $Z_1$, $Z_2$, $Z_3$, $Z_4$, $Z_5$, $Z_6$, $Z_7$, $Z_8$, $Z_9$, $Z_{10}$, $Z_{11}$, $Z_{12}$, $Z_{13}$, $Z_{14}$, $Z_{15}$, $Z_{16}$ of one pixel zone 500 (even if some other pixel zones are represented in these Figures).

Figure 14:
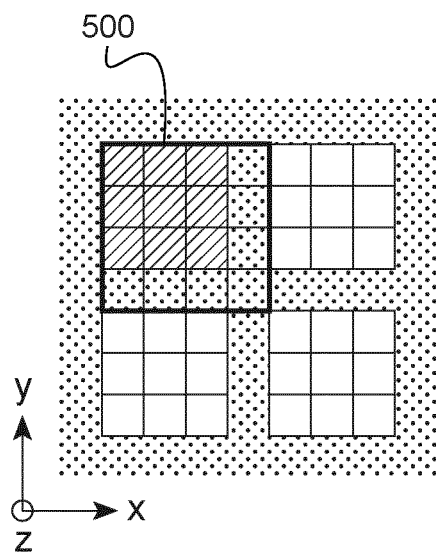

FIG. 14 shows the 9 areas which are irradiated among the projection of the first set of pixels. As visible in this Figure, only the hatched areas $Z_1$, $Z_2$, $Z_3$, $Z_4$, $Z_5$, $Z_6$, $Z_7$, $Z_8$, $Z_9$ are directly irradiated.

Figure 15:
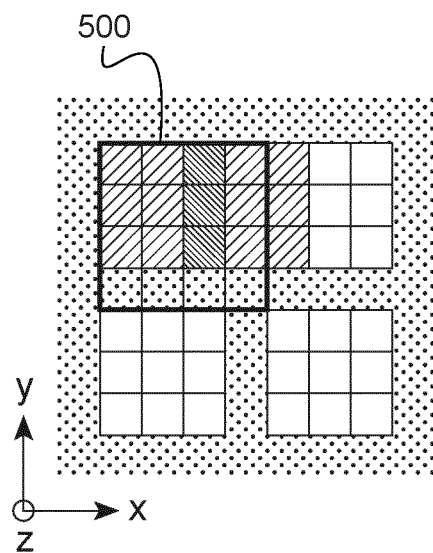

The projection of the second set of pixels is shifted, here with a slide on the x direction. FIG. 15 shows the state of the pixel zone 500. As the projection of the second set of pixels overlays the projection of the first set of pixels, some areas, here $Z_3$, $Z_6$, $Z_9$, are irradiated for a second time. Some areas $Z_2$, $Z_5$, $Z_8$, $Z_{10}$, $Z_{11}$, $Z_{12}$ are irradiated directly only once and some other areas $Z_{13}$, $Z_{14}$, $Z_{15}$, $Z_{16}$ do not receive one of the first two irradiations.

The projection of the third set of pixels is shifted, here with a slide on the −y direction from FIG. 15. FIG. 16 shows the state of the pixel zone 500. As the projection of the third set of pixels overlays the projections of the first and the second sets of pixels, one area $Z_9$ is irradiated directly for the third time. Some areas $Z_3$, $Z_6$, $Z_9$, $Z_{12}$ receive two irradiations after this projection. Some other areas $Z_1$, $Z_2$, $Z_4$, $Z_5$, $Z_7$, $Z_8$, $Z_{10}$, $Z_{11}$, $Z_{15}$, $Z_{16}$ receive only one irradiation. Two areas $Z_{13}$, $Z_{14}$ still do not receive directly one of the three irradiations.

The projection of the fourth set of pixels is shifted, here with a slide on the −x direction from FIG. 16. FIG. 17 shows the state of the pixel zone 500. As the projection of the fourth set of pixels overlays the projections of the first, the second and the third sets of pixels, one area $Z_9$ is irradiated directly for the fourth time. Some areas $Z_3$, $Z_6$, $Z_7$, $Z_8$, $Z_{12}$ $Z_{15}$ receive two irradiations after this projection. The other areas receive only one irradiation.

However, it is to be noted that the projections of the second, third and fourth set of pixel overlays the neighbouring pixel zones and in particular specific areas of said neighbouring pixel zones. Accordingly, considering a pixel zone 500 within the bulk of the material, it is surrounded by other neighbouring pixels zones 500 which corresponding set of pixels may overlap with pixel zone 500.

Accordingly, to understand the right irradiation rate received by each pixel area of pixel zone 500 in the bulk, the irradiation coming from projections corresponding to pixel zone 500 have to be taken into account, but the irradiation coming from projections corresponding to neighbouring pixel zone also have to be taken into account.

Thus, in the present example, using the 4 above-described projected sets of pixels within a layer, areas $Z_1$, $Z_3$, $Z_7$, $Z_9$, ie 25% of the surface corresponding to the pixel zone 500, have received the energy corresponding to 4 irradiations, here enough to be more energy than the first predetermined energy threshold $T_1$. Further, areas $Z_2$, $Z_4$, $Z_6$, $Z_8$, $Z_{10}$, $Z_{12}$, $Z_{13}$, $Z_{15}$, ie: 50% of the surface corresponding to the pixel zone 500, have received only 2 irradiations, which is here below the first threshold T1, and even below the critical Jacobs energy $E_C$. Eventually, areas $Z_5$, $Z_{11}$, $Z_{14}$, $Z_{16}$, ie 25% of the surface corresponding to the pixel zone 500, have received only one irradiation. Further in this case, each group of areas of the pixel zone 500 having received a given value of irradiation are spread apart in a most homogeneous possible way.

Accordingly, the first embodiment may respect the conditions of the second embodiment (described below) for about 75% of its surface, as the sum of 2 irradiations by the curing energy is generally below the Jacobs energy, and often below the critical Jacobs energy $E_C$, while the sum of 4 irradiations is above the Jacobs energy. Accordingly, such case, or similar cases with different numbers or arrangement of shifts between irradiations, may be included as a borderline case of the second embodiment.

Further, in case a second layer is formed on the first layer, with similarly 4 projected sets of pixels, slightly shifted so as to invert the parts of the areas of the pixel zone 500 which are more or less irradiated compared to the first layer, after going through 2 layers, all areas of the pixel zone 500 should have received about the same amount of energy, ie: 4 or 5 irradiations. This teaching may apply mutatis mutandis to similar cases with different numbers or arrangement of shifts between irradiations.

A second embodiment for a homogeneously polymerization is represented in FIGS. 6 and 7. The second embodiment is for example performed through several layers of curable material.

Before describing the second embodiment, we can observe in FIG. 10 the transmission of the curing surface energy irradiating the curable material through the depth D of an optical element formed by different layers.

The optical element is here formed by the superposition of the different layers $L_{n-6}$, $L_{n-5}$, $L_{n-4}$, $L_{n-3}$, $L_{n-2}$, $L_{n-1}$ and $L_n$, with the initial layer $L_{n-6}$, and the last one $L_n$.

The curve $F_1$ corresponds to the usual prior art in which a curing surface energy higher than the critical Jacobs energy $E_C$ is applied on each layer to completely cure it before putting another layer onto this layer. As previously explained, the corresponding layer is thus directly hardened. The transmission of the curing surface energy through the layer is not efficient and, discontinuities are visible between the different layers (these discontinuities are also shown in FIG. 12).

In FIG. 10, the curve $F_2$ refers to the present invention, in particular to a case where the critical Jacobs energy $E_C$ is reached after irradiations of at least one further layer, and the Jacobs energy is reached after at least two further layers (as shown in the figure as the bottom of layer $L_{n-1}$ has less energy than the critical Jacobs energy $E_C$, meaning layer $L_{n-1}$ is not wholly rendered solid. In this case, the curing surface energy applied onto each layer before putting another layer above it is lower than the critical Jacobs energy $E_C$. As introduced previously, under this irradiation, the layer is in an intermediate state between the liquid state and the solid state. The hardening of the layer occurs over successive irradiations until to reach the solid state. As the different layers are in this intermediate state, the discontinuities between the layers are less important than the ones observed with the curve $F_1$ (this effect appears in FIG. 11).

According to the second embodiment (as the first one previously described), the initial image pattern and the associated initial set of pixels are determined for applying the first curing surface energy $E_1$ on the surface of the curable material 50. The first curing surface energy $E_1$ is strictly lower than the first predetermined energy threshold $T_1$ (here the critical Jacobs energy $E_C$) and higher than the second predetermined energy threshold $T_2$ (here the induction surface energy $E_I$).

This initial set of pixels is projected on the surface of the curable material which is above the support 15. The initial layer 35c is formed. However, as the first curing surface energy $E_1$ is strictly lower than the critical Jacobs energy $E_C$, the curable material that is irradiated is in an intermediate state. This intermediate state means that the initial layer 35c is at least partially polymerized.

It is reminded that first predetermined energy threshold $T_1$ may also be the Jacobs energy $E_J$ for the given thickness of the layer. Further, it is to be noted that, within the case of the invention, and in particular this second embodiment, in order to reach the first predetermined energy threshold $T_1$ in two or more irradiations while being below the first predetermined energy threshold $T_1$ for each individual irradiation, the first curing surface energy $E_1$ is most generally lower than or equal to ⅔ of the first predetermined energy threshold $T_1$, or even half of the first predetermined energy threshold $T_1$, or even less. If the light depth penetration value $D_P$ is greater than the thickness of two layers, ⅔ of the Jacobs energy $E_J$ is lower than the critical Jacobs energy $E_C$. Therefore, if the first predetermined energy threshold $T_1$ is the Jacobs energy $E_J$, in most practical cases, the first curing surface energy $E_1$ is in fact lower than the critical Jacobs energy $E_C$. In other words, it is possible to describe the invention such that the first curing surface energy $E_1$ is lower than the first predetermined energy threshold $T_1$ (preferentially lower than or equal to the critical Jacobs energy $E_C$) whereas the sum of the first curing surface energy $E_1$, the second curing surface energy $E_2$ and the possible intermediate curing surface energy received between the first and second curing surface energy, is greater than or equal to a majored first predetermined energy threshold $T_1$, preferentially greater than or equal to the Jacobs energy $E_J$ for the given thickness of the layer.

In other words, in this second embodiment, the first curing surface energy $E_1$ directly applied to a layer is lower than the first predetermined energy threshold $T_1$ and the total curing surface energy directly and indirectly applied to a layer (ie directly or through other layers) is greater than or equal to the first predetermined energy threshold $T_1$.

This predetermined energy threshold $T_1$ may be equal to the critical Jacobs energy $E_C$. However the value of $E_c$ is reached empirically, and is prone to measurement errors, that is why we prefer considering the Jacobs energy $E_J$; and prefer to use a manufacturing process according to which the Jacobs energy is reached after at least irradiations of two further layers. Indeed, in such case, depending on the material, one may use a curing surface energy comprised between a third and a half of the calculated Jacobs energy, and it is thus ensured that the effective curing surface energy will be smaller than the critical Jacobs energy, despite any measurement error.

FIG. 6 shows an example of a side view of the initial layer 35c. The initial layer 35c comprises an alternating of intermediate state areas 30c (that were directly irradiated and for which the polymerization is occurring, called bright areas thereafter) and of underpolymerized areas 32c (that are not directly irradiated, and which are considered as non-polymerized for the simplified example). The underpolymerized areas 32c correspond to the shadowed areas previously described and derive from the interspaces between the micro-mirrors 8.

According to the second embodiment, the shadowed areas 32c are compensated during the formation of one or several other layers on the top of the initial layer 35c in such a way that the shadowed areas 32c of each layer do not overlap.

Each other layer is manufactured based on at least one irradiation with a corresponding curing surface energy. In practice, a number H of irradiations of the surface of the curable material on different layers is determined so that a part of each corresponding curing surface energy is received by at least a part of the first initial layer, and that H irradiations are both sufficient and necessary for said part of the first initial layer to receive a curing surface energy corresponding to the first predetermined energy threshold $T_1$, here the Jacobs' energy $E_J$. In other words, the number H corresponds to the number of irradiations received by the first initial layer, during the formation of multiple superimposed layers, in order to receive the Jacobs' energy $E_J$. In other words, to respect a determined value of the number H, the sum of the energies that are received by the considered layer during the H-1 irradiations (each energy being received directly or through other layers) is lower than the solid predetermined energy threshold $T_S$, and the sum of the energies that are received by the considered layer during the H irradiations (directly or through other layers) is greater than or equal to the solid predetermined energy threshold $T_S$. In other words, to respect a determined value of the number H, the first curing surface energy ($E_1$) has to be chosen, modulo the light depth penetration value $D_P$, so that H-1 times the first curing surface energy $E_1$ is lower than the first predetermined energy threshold $T_1$, and H times the first curing surface energy $E_1$ is greater than or equal to the first predetermined energy threshold $T_1$.

In this embodiment, because a single irradiation is generated for each layer, the number H corresponds to a total number of irradiations. Accordingly, once a layer is irradiated with the corresponding curing surface energy for a layer, part of the energy is used within this layer to begin the polymerization of the curable material of this layer, and part of the energy is transmitted to the layers already presents, overlapped by the curing surface energy. Within those layers, part of the energy is used within the closest layer to further the polymerization of the curable material, and a remaining part is transmitted further within the curable material.

In a variant, we may consider another situation that is a mix between the first and the second embodiment. In this variant, the method comprises H steps of irradiating the layers, some or all of those step being comprising substeps of directly irradiating more than one time a same layer (some layers receive more than one direct irradiation).

In the second embodiment, each corresponding curing surface energy, received directly by one layer, is higher than the second predetermined energy threshold $T_2$. The values of the H respective curing surfaces energies are chosen so that the sum of the first curing surface energy $E_1$ and the corresponding curing surface energies received by each voxel, in the parts of the voxel overlapped by the H curing surface energies, is higher than or equal to the solid predetermined energy threshold $T_S$ (in order to polymerize the whole thickness of the initial layer).

According to an embodiment of the invention, the number H is an integer higher than or equal to 3 that defines the kinetic of the used process. Each corresponding curing surface energy received depends on the depth penetration value $D_P$ of the curable surface energy within the curable material, thus taking into account the light absorption of the curable material. In other words, each corresponding surface energy needs to be sufficient to go through several layers in order to polymerize one specific voxel if it is necessary.

According to an embodiment of the invention, the number of layers H and the thickness of layers are determined such the product of the number H of layers by the thickness of the layer is equal to or lower than the light depth penetration value $D_P$ of the curable surface energy within the curable material. In practice, in order to compensate the shadowed areas in a given layer, the projected set of pixel forming the contour of the curable surface energy of this given layer is shifted with regard to the projected set of pixel forming the contour of the curable surface energy of the layer or layers immediately above or below the given layer. Thus in an embodiment, the light depth penetration value $D_P$ is sufficiently high to limit local variations of curable material state between the pixels of the projected set of pixels, and thus may be greater than the above mentioned product of the number of layers by the thickness of the layer.

According to the second embodiment, in a practical manner, after the initial layer 35c is formed, having been irradiated by the first curable surface energy $E_1$, a portion of uncured curable material is added on the top of it to form a new layer. This portion of uncured curable material is placed between the initial layer 35c and the energy source. In practice, the curable material is for example added by the recoater 12. As an alternative, the support 15 (bearing the initial layer 35c) can be moved vertically by the shifting means 20 in order to immerse the initial layer 35c in the curable material in order to add some liquid curable material (corresponding to uncured curable material) on the top of the initial layer 35c, with or without help of a membrane.

Before irradiating this liquid curable material (or uncured curable material) with another projected set of pixel, the manufacturing system 1 is adjusted in such a way that the other set of pixel is projected in order to cover the shadowed areas 32c. In practice, the support 15 can be shifted along an axis sensibly parallel to the surface of the curable material. As an operationally simpler alternative, the optical system 4 can be adjusted in such a way that the other projected set of pixel is shifted and projected on the shadowed areas 32c.

As represented in FIG. 7, another layer 37c is formed on the top of the initial layer 35c so that at least a part of the pixels of the curable surface energy, corresponding to the bright areas mentioned above, irradiating the other layer 37c overlays at least one unpolymerized area 32c. By repeating this step, due to the transmission of the corresponding curing surface energy through the different layers, the parts of the initial layer 35c overlapped by the H irradiations are polymerized in a state which is considered as solid as the sum of the first and of the other curing surface energies is higher than or equal to the solid predetermined energy threshold $T_S$. It is reminded that the term unpolymerized is used for area 32c due to the fact that the example is presented so as to simplify the explanation, as mentioned above. In practice, it is probable that the unpolymerized areas 32c are slightly polymerized, even if less polymerized than the bright areas 30c.

The advantage of this method, with or without managing the shadowed areas, is that the curable material of the superimposed layers can organize itself in such a manner that the material of the layers interpenetrates with each other (which reduces the defects) thanks to a collapsing process between layers which occurs while being in an intermediate state of matter. For that, light dose distribution needs to be highly controlled. In particular, the lower the variation of matter state between adjacent voxel, the better defects reduce. FIGS. 11 and 12 respectively show a simplified illustration of the arrangement of the curable material in the case of the present invention and in the case of the prior art as understood by the inventors, without being bound by theory. As visible in FIG. 12 (representing the prior art), several layers $L_{n-1}$, $L_{n-2}$, $L_{n-3}$, $L_{n-4}$ are in a solid state S. However, as each layer was irradiated with a curing surface energy higher than the critical Jacobs energy $E_C$, each layer became in the solid state S independently form the others, and in particular each layer is in the solid state S before a further layer is formed. Discontinuous material properties are thus observed, in particular at the interface between layers. As shown in FIG. 11 regarding the present invention, the layers $L_{n-3}$, $L_{n-4}$ are in a solid state S, the layers $L_{n-1}$, $L_{n-2}$ are in an intermediate state In and the layer n is still in a liquid state L. As the curable material is irradiated in such a way that the superimposed layers can organize themselves, continuous material properties are observed.

Using this embodiment of the invention thus increases the optical quality with regard to the optical defects related to the use of the superposition of layers of material. Indeed, it has been noted that the formation of an optical device with a stacking of a multiplicity of layers induces a repetition of a pattern, formed by a variation of optical properties between the core of a layer and the interface between two layers. Such repetitive alternation of optical properties induces the formation of diffracting defects, hereafter stacking defects, even in case of slight variations of optical properties. These stacking defects are even further noticeable if the optical device is built with layers arranged sensibly parallel to the optical axis.

Accordingly, using the invention, the transition from one layer to the other is more homogeneous and those stacking defects are minimized or even avoided.

Further, if using additionally with the management of the shadowed areas described above, the optical quality further improves with regard to the optical defects related to using a pixelated energy source or optical system 4.

We consider an illustrative example A in which the curable material is based on methacrylate monomers with experimentally determined values of the critical Jacobs energy $E_C$ of 7 mJ and the light depth penetration value $D_P$ of 200. In order to build layers with a thickness of 10 µm, the first threshold (here equal to the Jacobs energy $E_J$), would thus be $T_1$=7.56 mJ (=$E_J$). The second threshold would be about $T_2$=0.12 mJ.

The first curing surface energy is chosen so as to verify the following relation $T_2<E_1$=3.2 mJ <leading to reaching the first threshold after the irradiation of about 2 further layers.

Considering the subdivision of the pixel zone as previously introduced in FIG. 13, the example A corresponds to a case without shifting the projection of the different sets of pixels.

FIG. 18 shows the evolution of the conversion rate $C_V$ as a function of the successive irradiations in the case of this example A. Two curves are distinguished in this Figure.

The curve $C_1$ is horizontal, corresponding to a conversion rate close to 0. This curve $C_1$ corresponds to the areas of the pixel zone which do not receive an irradiation. Considering that the projected set of pixels is the one represented in FIG. 14, the curve $C_1$ thus shows the evolution of the conversion rate of the areas $Z_{10}$, $Z_{11}$, $Z_{12}$, $Z_{13}$, $Z_{14}$, $Z_{15}$, $Z_{16}$ which are not directly irradiated. As the projection of the set of pixels is not shifted in the course of the irradiations, these areas $Z_{10}$, $Z_{11}$, $Z_{12}$, $Z_{13}$, $Z_{14}$, $Z_{15}$, $Z_{16}$ still remain not directly irradiated. These areas thus correspond to the unpolymerized area 32c previously described.

As visible in FIG. 18 regarding the curve $C_2$, for some other areas of the pixel zone, the conversion rate $C_V$ increases in the course of the irradiations. Considering that the projected set of pixels is the one represented in FIG. 14, the curve $C_1$ thus shows the evolution of the conversion rate of the areas $Z_1$, $Z_2$, $Z_3$, $Z_4$, $Z_5$, $Z_6$, $Z_7$, $Z_8$, $Z_9$ which are directly irradiated. As these areas are irradiated several times, the conversion rate $C_V$ increases until reaching the maximum conversion rate of 100%. The corresponding areas $Z_1$, $Z_2$, $Z_3$, $Z_4$, $Z_5$, $Z_6$, $Z_7$, $Z_8$, $Z_9$ are thus fully cured (and correspond to the bright areas 30c previously introduced).

As visible in FIG. 18, there is a big discrepancy between the two kinds of areas regarding the conversion rate, leading thus to the formation of defects.

It is reminded that this example A is a simplified version of what happens in reality, so that in practice the unpolymerized areas 32c might, in the end, be close to fully polymerized. However the model shows that their polymerization is in a mode, kinetics and pace, really different from the areas 30c.

We consider another illustrative example, called example B in the following, using the same curable material based on methacrylate monomers having values of the critical Jacobs energy $E_C$ of 7 mJ and the light depth penetration value $D_P$ of 200. In order to build layers with a thickness of 10 µm, the first threshold (here equal to the Jacobs energy $E_J$), would thus be $T_1$=7.56 mJ (=$E_J$). The second threshold would be about $T_2$=0.12 mJ.

The first curing surface energy is chosen so as to verify the following relation $T_2<E_1$=2.33 mJ$<T_1$, leading to reaching the first threshold after the irradiation of about 2 further layers for a total number of irradiations to reach the first threshold H=3.

Regarding the features of the projected images of each layer, the parameters are the following:

Pixels size=30×30 um

Shadow areas size=10×30 um

Considering the subdivision of the pixel zone as previously introduced in FIG. 13, the example B corresponds to a case in which the projections of the different sets of pixels are shifted one from another. Here, the projections are shifted according to the scheme presented in FIGS. 14 to 17 (the first one along the x direction, the second one along the −y direction and the third one along the −x direction. In practice here, the example B illustrates the second embodiment. Each shift of the projection of the sets of pixels is thus linked to a new layer.

FIG. 19 shows the evolution of the conversion rate $C_V$ as a function of the successive irradiations in the case of this example B. Nine curves are distinguished in this Figure.

Each curve corresponds to at least an area of the pixel zone 500.

As visible in this Figure, the conversion rate linked to the curve $C_{11}$ evolves smoothly. It means that the corresponding area is directly irradiated by all projections of the different sets of pixels. Considering the subdivision of the pixel zone 500 previously introduced the curve $C_{11}$ corresponds to the areas $Z_1$, $Z_3$, $Z_7$, $Z_9$. As these areas are always irradiated, the conversion rate $C_V$ gradually increases until reaching the maximum conversion rate of 100%.

The conversion rate linked to the curve $C_3$ increases per stage. During the first irradiations, the corresponding area is not directly irradiated. The conversion rate thus remains close to 0. As the projections of the sets of pixels are shifted, this area is irradiated, for example at the fourth irradiation. This area is thus irradiated only once during the cycle of projections of the sets of pixels. However, as each irradiation is linked to the formation of a new layer on the top of the one(s) already built, the curing surface energy reaches actually the area is lower than the one directly received by the other areas (as a part is absorbed by the layer(s) which is(are) on the top). The conversion rate is thus lower.

The evolution observed in the curves $C_4$, $C_5$, $C_7$, $C_8$, $C_9$ is similar, regarding the form, to the one described for the curve $C_3$ (and can thus be derived using the same reasoning).

The curves $C_3$, $C_4$, $C_5$, correspond to the areas $Z_5$, $Z_{11}$, $Z_{14}$, $Z_{16}$ which were directly irradiated once during the cycle of the projections However, the conversion rate is higher for the areas represented by the curves $C_7$, $C_8$, $C_9$ as they correspond to the areas $Z_2$, $Z_4$, $Z_6$, $Z_8$, $Z_{10}$, $Z_{12}$, $Z_{13}$, $Z_{15}$, which are irradiated twice during the cycle of projections. It is to be noted the comparing the example B to the example A shows that an homogeneity of the conversion rate and of the polymerization kinetics or pace is improved when using a process aiming to manage the shadowed areas. Indeed, there are much less variations of conversion rate in the example B than in the example A. A lens manufactured according to the example B has less intense diffractive defects linked to the pixels of the forming unit 3 than a lens manufactured according to the example A. Both cases are according to the second embodiment and manage to reduce or eliminate the stacking diffracting defects.

The manufacturing system 2 shown in FIG. 2 and previously described is suitable for executing a method for manufacturing an optical element using the additive manufacturing technology. The example of the method presented here is described in the case of a manufacturing layer by layer. The optical element is thus formed from the superposition of the different polymerized layers. As an alternative, the method can also be suitable for manufacturing the optical element according to others additive manufacturing techniques (different from the superposition of layers).

This method is compatible with chain growth polymerization (also named addition polymerization) or step growth polymerization (also named condensation polymerization).

Previously to the beginning of the method, and considering the optical element to be manufactured, the computer element 6 determines, for each voxel of the optical element, which energy it will receive and what will be the state of the matter and/or polymerization rate and/or kinetic of polymerization for this voxel. In other words, the computer element 6 determine a number of irradiation steps necessary to reach the state of the curable matter expected or conversion rate or kinetic of polymerization desired and how much energy will be provided at each step.

Based on these parameters, the computer element 6 here derives the number of layers needed to be formed to manufacture the optical element 100, the number of irradiations each voxel of each layer will have to receive in order that the curable material becomes solid, the number H of irradiation of different layers that will be used to in order that the curable material of a given layer becomes solid and the associated curing surface energy. All these parameters are determined in order to manufacture a homogeneously polymerized optical element both along the axis of stacking of the layers and possibly within each layer.

In particular, the computer element 6 may take into account shadowed areas that can be formed between the projections of each pixel of the set of pixels. The computer element 6 thus derives also the number n of sets of pixels to project on the surface of the curable material (thus corresponding to a number n of projected images).

The relative positions of each projection of the sets of pixels from the others are also determined. As an example, the number n of projected sets of pixels is higher than the number H of each irradiations of each voxel meaning that a certain proportion of each voxels is irradiated with more than the first predetermined energy threshold $T_1$ when the n sets of pixels are projected. As an example, this proportion is equal to 50%, meaning that half of the volume of the voxels receives at least the first predetermined energy threshold $T_1$. If the number n is higher than the number H, a part of each voxel may have cumulatively received the first predetermined energy threshold $T_1$ before the $n^{th}$ set of pixels is projected. The method begins with a step of providing an initial portion of uncured curable material 50. In practice, it means for example moving the support 15 in order to immerse it and have the initial portion of uncured (or liquid) curable material 50 on the top of the support 15. As an alternative, the initial portion of curable material can be provided by the recoater 12. In an embodiment, the initial portion of curable material 50 is provided on another volume of curable or cured or partially cured material.

The method then comprises a step of determining a first image pattern associated with a first set of pixels of the energy source 2. This first set of pixels is associated with the application of a first curing surface energy $E_1$. This step of determining is followed by a step of projecting the first set of pixels onto the surface the curable material. The first set of pixels thus defines a first projected image, with a first contour.

These steps of determining and projecting thus lead to a step of forming a first part of the optical element. As previously mentioned in reference to FIGS. 3 and 6, at this stage, the first part is not fully polymerized (the first part is in an intermediate state). In practice, the conversion rate of the first part is as low as it can be, depending on the second predetermined energy threshold, the light depth penetration value and a speed of manufacturing. A lower starting conversion rate, corresponding to a high number of layers H before reaching the Jacobs energy $E_J$ allows a better continuity of material properties between layers and a better interpenetration of adjacent parts.

In order to homogeneously polymerize the first part (and the whole optical element), the present method is preferentially based on the second embodiment previously presented. As an alternative, the method can be based on variations of said embodiment where teachings of the first embodiment are introduced, as long as the surface energy directly received by a layer, before forming a further layer, is lower than the first predetermined energy threshold $T_1$, preferentially lower than the critical Jacobs energy $E_C$ for at least 70% of subparts of the voxels to harden, preferentially at least 80%, more preferentially for any parts of the voxels. As an alternative, it can be based on the first embodiment previously introduced.

As another alternative, the method can be based on a combination of both first and second embodiments. In this case, the optical element is formed by combining irradiations to form layers and irradiations over each formed layer. As an example, a scheme to form the optical element can be: forming a first layer, then irradiating this first layer twice (with a shift between the two projections), then forming a second layer and then following a cycle of movements to irradiate three times the second layer (and the first layer by transmission of the curable energy through the second layer). In such embodiments, the numbers of irradiations per layer may be adapted from one to about 5 or 6 or more without betraying this embodiment of the invention.

In practice, a first layer may receive 4 irradiations as described above with regard to the first embodiment, considering that 4 irradiations are not sufficient to reach the Jacobs energy $E_J$, and a second layer may be formed on the first layer, with similarly 4 projected sets of pixels, slightly shifted so as to invert the parts of the pixels more or less irradiated when compared to the first layer. Thus after going through 2 layers, all parts of the pixels have received about the same amount of energy, actually 5 irradiations. This teaching may apply mutatis mutandis to similar cases with different numbers or arrangement of shifts between irradiations. In other words this example corresponds to having a cycle of n=8 projected sets of pixels which is spread into H=2 layers, arranged such that along the cycle, each part of the pixel has been irradiated by 5 sub-steps of irradiations. In some variants, the Jacobs energy $E_J$ is reached with the formation of 2 layers. In some other variants, the Jacobs energy $E_J$ is reached after irradiating H=4, 6 or more layers.

In a particular variant, each layer may receive directly n irradiations with n projected sets of pixels, shifted slightly from each other, in order to cover the whole surface of the curable material with a similar amount of curing surface energies (and thus to polymerize as homogeneously as possible the whole initial layer). The several sets of pixels thus need to be projected successively on the same surface of the curable material. The corresponding curing surface energies are thus directly applied successively on the initial layer, before adding a new layer of (uncured) curable material onto this initial layer. However, contrarily to the first embodiment described above, and in accordance with the second embodiment described above, the n curing surface energies applied to each layer are such that their sum is higher than the second predetermined energy threshold $T_2$ and their sum is strictly lower than the first predetermined energy threshold $T_1$. The n curing surface energies are determined in order to polymerize into an intermediate state the whole initial layer. The n curing surface energies are thus determined by distributing the first curing surface energy $E_1$ as introduced in the second embodiment to the several projected sets of pixels. The sum of these curing surface energies received by the initial layer is equal to the first curing surface energy $E_1$ which is strictly lower than the first predetermined energy threshold $T_1$.

We consider another illustrative example, called example B in the following, using the same curable material based on methacrylate monomers having values of the critical Jacobs energy $E_C$ of 7 mJ and the light depth penetration value $D_P$ of 200. In order to build layers with a thickness of 10 μm, the first threshold (here equal to the Jacobs energy $E_J$), would thus be $T_1$=7.56 mJ (=$E_J$). The second threshold would be about $T_2$=0.12 mJ.

The first curing surface energy $E_1$ is chosen so as to verify the following relation $T_2 < E_1 = 2.33$ mJ<leading to reaching the first threshold after the irradiation of about 2 further layers for a total number of irradiations to reach the first threshold H=3.

Further, in this embodiment, each layer is irradiated directly 4 times, in 4 set of pixels, each set being directly applied once to each layer in succession: the deduced curing surface energy of associated with each projection of sets of pixels=$E_1/(1+3)$=0.8 mJ.

Regarding the features of the projected images, the parameters are the following:

Pixels size=30×30 um
Shadow areas size=10×30 um

Considering the subdivision of the pixel zone as previously introduced in FIG. 13, the example C corresponds to a combination of the first and the second embodiments (case in which the projections of the 4 sets of pixels are shifted one from another through one layer and is repeated with the formation of other layers). Here, among one layer, the projections are shifted according to the scheme presented in FIGS. 14 to 17 (the first one along the x direction, the second one along the −y direction and the third one along the −x direction). In practice here, the example B illustrates the second embodiment.

FIG. 20 shows the evolution of the conversion rate $C_V$ as a function of the successive irradiations in the case of this example C. Three curves are distinguished in this Figure.

Each curve corresponds to at least an area of the pixel zone 500.

As visible in this Figure, according to this example C, the conversion rate evolves smoothly as each area of the pixel 500 is directly irradiated at least once (as the first and the second embodiments are combined here). However, the magnitude of the conversion rate is different according to the number of irradiations which are received by each area of the pixel zone 500.

The curve $C_{20}$, with the lowest conversion rate, corresponds to the areas which are directly irradiated only once per layer, here the areas $Z_5$, $Z_{11}$, $Z_{14}$, $Z_{16}$. The curve $C_{21}$, with the intermediate conversion rate, corresponds to the areas which were directly irradiated twice per layer, here $Z_2$, $Z_4$, $Z_6$, $Z_8$, $Z_{10}$, $Z_{12}$, $Z_{13}$, $Z_{15}$,.

The curve $C_{22}$, with the highest conversion rate, corresponds to the areas which are irradiated four times per layer, here $Z_1$, $Z_3$, $Z_7$, $Z_9$.

This variant of the second embodiment shows that it is also an interesting solution as compared to the example B. However, it is much more costly, regarding the process duration and calculation, as each layer has to be irradiated multiple times, here 4, before switching to another layer, whereas in the other variant of the second embodiment, each layer is directly irradiated only once.

In practice, the method comprises a number H of steps of providing uncured curable material and irradiating the surface of the curable material, including the first step of providing the first layer, so that a part of each corresponding curing surface energy (to each irradiation) is received by at least a part of the formed first layer of the optical element by transmission through the different layers.

Depending on the case, the sum of the curing surface energies provided to the first layer by irradiating all the H layers may be such that the first predetermined energy threshold $T_1$ is reached upon irradiating the $H^{th}$ layer. Alternatively, the at least one irradiation of the first layer almost reaches the first predetermined energy $T_1$ threshold such that a first irradiation of the second layer provides enough energy by transmission to the first layer so that the first predetermined energy $T_1$ threshold is reached within the first layer. The additional transmission of energy to the first layer through the H layers enabling to further cure the curable material and possibly curing the shadowed areas. Any variations between the two cases described above are possible.

In practice, each step of irradiating is associated with the determination of at least an image pattern and the associated set of pixels for applying the corresponding curing surface energy and the projection of this set of pixels defining the associated projected image. In an embodiment, the projection associated with each step of irradiating is shifted from the previous ones, with regard to the position of the first part. In other words, it means that a relative position of a projected set of pixel is defined with regard to another projected set of pixels such that at least one pixel of the projected set of pixels overlays at least partially two pixels of the other projected set of pixels.

In practice, the support 15 can be moved along an axis sensibly parallel to the surface of the curable material. Another configuration is to adjust the settings (for example position and/or orientation) of the optical system 4.

In this case, one step of irradiating corresponds for example to irradiate at least partially the formed first part of the optical element with an intermediate curing surface energy. This step of irradiating is associated with the determination of an image pattern and the associated set of pixels for applying the intermediate curing surface energy and the projection of this set of pixels defining the associated projected image. The sum of the first curing surface energy $E_1$ and the intermediate curing surface energy is strictly lower than the first predetermined energy threshold $T_1$, meaning that after this step of irradiating, the first part of the optical element is still in an intermediate state.

In complement or as an alternative, the support 15 can be shifted along an axis that is sensibly orthogonal to the surface 55 of the curable material 50. In other words, the support 15 can be shifted vertically so as to provide a second portion of the uncured curable material on the support 15, and particularly around the formed first part.

When the optical element is manufactured layer by layer, the second portion is for example provided on the top of the first formed part of the optical element. FIG. 8 represents an example of an ophthalmic lens 200 manufactured according to the present invention. When the optical element is an ophthalmic lens 200, according to an embodiment of the invention, the first part and the second part are thus superimposed along an axis $L_s$ roughly orthogonal to an optical axis $L_L$ of this ophthalmic lens 200 (this optical axis $L_L$ being for instance, in the case of a monofocal lens, an axis along which the light is not deviated when it passes through the lens). As an alternative, the axis $L_s$ of superimposition is tilted from more than 45 degrees relative to this optical axis $L_L$.

The method thus comprises a step of determining a second image pattern associated with a second set of pixels of the energy source 2. This second set of pixels is associated with the application of a second curing surface energy $E_2$. This second curing surface energy $E_2$ is higher than the second predetermined energy threshold $T_2$. This step of determining is followed by a step of projecting the second set of pixels onto the surface the curable material. The second set of pixels thus defines a second projected image.

These steps of determining and projecting thus lead to a step of forming a second part of the optical element.

If the second part is the last one to be formed in the manufacturing of the optical element, the sum of the first curing surface energy $E_1$, and the second curing surface energy $E_2$ is higher than or equal to the first predetermined energy threshold $T_1$, thus allowing the polymerization of the whole optical element so as to be solid with the meaning of Jacobs (corresponding to a conversion rate higher than 70% for example, or 60% or 80% depending on the curable material).

If the second part is not the last one to be formed in the manufacturing of the optical element, further steps of irradiating and forming other parts are repeated after the formation of this second part It is reminded that some intermediate steps of irradiating may have happened between forming the first part and the second part, for example for forming intermediate parts such as a third part and/or a fourth part. The sum of the first curing surface energy $E_1$, of each curing surface energy associated to the intermediate steps of irradiating and the second curing surface energy $E_2$ is higher than the first predetermined energy threshold $T_1$. The further steps may for example have the effect of completing the polymerization of the second part and of the possible intermediate parts or may further enable for the first part to receive more energy than just the energy necessary to reach the first predetermined energy threshold $T_1$ and thus enable a greater conversion rate than just the one reached by applying the first predetermined energy threshold $T_1$, for example the Jacobs energy $E_J$.

The method may further comprise a final step of irradiating the formed parts of the optical element with a final curing surface energy in order to polymerize the optical element and particularly its edge. The final curing surface energy is here higher than or equal to the first predetermined energy threshold $T_1$. This final curing, also called sometimes post-curing, aims to complete the polymerization and/or relax the internal stress of the material by UV and/or thermal treatment. In other words, the final step of irradiating allows applying a curing surface energy which is enough to get directly a high conversion rate, for example higher than 70%, more preferentially higher than 90%, on any part still in intermediate state. The optical element is then completely formed.

Finally, the method comprises one or more steps of post-processing once the optical element is obtained. These steps of post-processing are for example subtractive machining like polishing or a step of additive working like coating. After these steps of post-processing, the optical element is ready for use.

The invention claimed is:

1. A method for manufacturing an optical element from a curable material using an additive manufacturing technology comprising:
providing a first portion of uncured curable material;
forming a first part of the optical element by irradiating the surface of the curable material-of said first portion with a first curing surface energy, the first curing surface energy-being strictly lower than a first predetermined energy threshold and higher than a second predetermined threshold, the first predetermined energy threshold being lower than or equal to a solid predetermined energy threshold corresponding to an energy sufficient to make the first part of the optical element solid on the whole thickness of said first part of the optical element, the second predetermined energy threshold being equal to an induction surface energy; and
forming, after the irradiation of the first part with the first curing surface energy, at least a second part of the optical element, distinct from the first part of the optical element, by irradiating, with at least a second curing surface energy, said second curing surface energy being higher than the second predetermined energy threshold, the surface of the curable material, the second curing surface energy irradiating both the second part of the optical element and at least a portion of the first part of the optical element, the sum of the first curing surface energy, and the portions of the at least second curing surface energy received by said first part of the optical element being sufficient to make the first part of the optical element solid.

2. The method according to claim 1, comprising, previous to said step of providing a first portion of uncured curable material, a step of providing an initial portion of curable material which is at least partially cured, said first portion of uncured curable material being placed between said initial portion and an energy source suitable for irradiating the surface of the curable material with the first curing surface energy and the second curing surface energy.

3. The method according to claim 1, wherein the first predetermined energy threshold is determined for the first part of the optical element by using the Jacobs' equation defined as $\{E_j = E_c * \exp(th/D_P)\}$ with
$E_j$ a Jacobs energy, the solid predetermined energy solid being equal to said Jacobs energy;
th a thickness of the first part of the optical element;
$D_p$ a light depth penetration value of the first curing surface energy within the curable material;

$E_c$ a critical Jacobs energy defined for the curable material; and the first predetermined energy threshold being a function of the critical Jacobs energy.

4. The method according to claim 3, wherein the first predetermined energy threshold is the critical Jacobs energy defined for the curable material, the sum of the first curing surface energy and the at least second curing surface energy being higher than or equal to the Jacobs energy.

5. The method according to claim 1, comprising a number of steps of irradiating the surface of the curable material so that a part of a curing surface energy is received by at least a part of the first part of the optical element at each step of irradiation, each curing surface energy being higher than the second predetermined threshold, the sum of each curing surface energy received by the first part being higher than or equal to the first predetermined energy threshold, said number being an integer higher than or equal to 3.

6. The method according to claim 5, wherein a step of irradiating the surface of the curable material comprises a substep of irradiating at least partially said first part of the optical element with an intermediate curing surface energy, the sum of the first curing surface energy and the intermediate curing surface energy being strictly lower than the first predetermined energy threshold.

7. The method according to claim 1, comprising:
providing a second portion of curable material between an energy source and the first part of the optical element:
forming the second part of the optical element with said second portion of curable material; and
irradiating the surface of the curable material with at least the second curing surface energy so that a part of the second curing surface energy is received by at least a part of the first part of the optical element.

8. The method according to claim 1, wherein the step of forming the first part of the optical element comprises:
determining a first image pattern associated with a first set of pixels of an energy source suitable for applying the first curing surface energy; and
projecting the first set of pixels of the energy source onto the surface of the curable material, the first set of pixels defining a first projected image;
and wherein the step of forming the second part of the optical element comprises:
determining a second image pattern associated with a second set of pixels of an energy source suitable for applying the second curing surface energy; and
projecting the second set of pixels of the energy source onto the surface of the curable material, the second set of pixels defining a second projected image;
a relative position of the second set of pixels with regard to the first set of pixels being defined such that at least one pixel of the projected second set of pixels overlaying partially at least two pixels of the projected first set of pixels.

9. The method according to claim 8, comprising:
determining at least another image pattern associated with another set of pixels of an energy source suitable for applying another curing surface energy;
projecting successively each set of pixels of the energy source onto the surface of the curable material with a relative position such that at least one pixel of the last projected set of pixels overlays partially at least two pixels of each previously projected set of pixels;
the number of projected sets of pixels being an integer higher than or equal to 3.

10. The method according to claim 9, wherein the relative positions of the sets of pixels between the projected images are determined in order to minimize the variation of hardening surface energies received by the first part of the optical element.

11. The method according to claim 9, wherein the number is determined so that a total curing surface energy received by the first part of the optical element is at least equal to the solid predetermined energy threshold.

12. The method according to-claim 1, wherein the optical element is an ophthalmic lens.

13. A manufacturing system for manufacturing an optical element from a curable material using an additive manufacturing technology comprising:
a container suitable for containing an uncured curable material;
a support suitable for supporting the optical element; and
a forming unit programmed to form a first part of the optical element by irradiating the surface of the curable material with a first curing surface energy, the first curing surface energy being strictly lower than a first predetermined energy threshold and higher than a second predetermined threshold, the first predetermined energy threshold being lower than or equal to a solid predetermined energy threshold corresponding to an energy sufficient to make the first part of the optical element solid on the whole thickness of said first part of the optical element, the second predetermined energy threshold being equal to an induction surface energy, the forming unit being also programmed to form at least a second part of the optical element by irradiating the surface of the curable material overlapping at least partially said first part of the optical element with at least a second curing surface energy, said second curing surface energy being higher than the second predetermined energy threshold, the sum of the first curing surface energy and the second curing surface energy being sufficient to make the first part of the optical element solid.

14. The manufacturing system according to claim 13, further comprising a shifting unit programmed to shift the support in relation to the forming unit in order to shift the formed first part of the optical element along an axis roughly orthogonal to the surface-of the curable material.

15. The manufacturing system according to claim 13, wherein the forming unit comprises an energy source suitable for irradiating the surface of the curable material-with the first curing surface energy and the second curing surface energy.

16. The manufacturing system according to claim 15, wherein the forming unit comprises:
a computer element programmed to determine a first image pattern associated with a first set of pixels of the energy source suitable for applying the first curing energy, the computer element being also programmed to determine a second image pattern associated with a second set of pixels of the energy source suitable for applying the second curing surface energy; and
an optical system suitable for projecting the first set of pixels of the first curing surface energy onto the surface of the curable material, the first set of pixels defining a first projected image, the optical system being also suitable for projecting the second set of pixels of the energy source onto the surface of the curable material, the second set of pixels defining a second projected image.

17. The method according to claim 1, wherein the sum of the first curing surface energy and the portions of the at least second curing surface energy received by said first part of the optical element is higher than or equal to the solid predetermined energy threshold.

18. The method according to claim 4, wherein the sum of the first curing surface energy and the at least second curing surface energy is higher than or equal to 1.2 times the Jacobs energy.

19. The method according to claim 18, wherein the sum of the first curing surface energy and the at least second curing surface energy is higher than or equal to 1.5 times the Jacobs energy.

20. The method according to claim 11, wherein the number is determined so that the total curing surface energy received by the first part of the optical element is at least equal to the Jacobs energy.

21. The method according to claim 20, wherein the number is determined so that the total curing surface energy received by the first part of the optical element is such that a total curing surface energy received by any point of the first part of the optical element is at least equal to the critical Jacobs energy.

22. The manufacturing system according to claim 13, wherein the sum of the first curing surface energy and the portions of the at least second curing surface energy received by said first part of the optical element is higher than or equal to the solid predetermined energy threshold.

\* \* \* \* \*